United States Patent
Thadikaran et al.

(10) Patent No.: US 9,916,454 B2
(45) Date of Patent: Mar. 13, 2018

(54) USER CONTROLLABLE PLATFORM-LEVEL TRIGGER TO SET POLICY FOR PROTECTING PLATFORM FROM MALWARE

(71) Applicant: Intel Corporation, Santa Clara, CA (US)

(72) Inventors: Paul J. Thadikaran, Portland, OR (US); Nicholas D. Triantafillou, Portland, OR (US); Thomas R. Bowen, Albuquerque, NM (US); Paritosh Saxena, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/187,530

(22) Filed: Jun. 20, 2016

(65) Prior Publication Data
US 2016/0306978 A1   Oct. 20, 2016

Related U.S. Application Data

(62) Division of application No. 13/976,253, filed as application No. PCT/US2011/067029 on Dec. 22, 2011, now Pat. No. 9,372,988.

(51) Int. Cl.
*G06F 21/57* (2013.01)
*G06F 12/14* (2006.01)

(52) U.S. Cl.
CPC ........ *G06F 21/575* (2013.01); *G06F 12/1466* (2013.01); *G06F 2212/1052* (2013.01)

(58) Field of Classification Search
CPC combination set(s) only.
See application file for complete search history.

(56) References Cited

U.S. PATENT DOCUMENTS

| | | | |
|---|---|---|---|
| 5,872,995 A | 2/1999 | Chaiken | |
| 6,330,648 B1 | 12/2001 | Wambach et al. | |
| 6,633,964 B2 * | 10/2003 | Zimmer | G06F 12/1433 710/200 |
| 6,707,749 B2 * | 3/2004 | Ngo | G11C 8/12 365/185.11 |

(Continued)

FOREIGN PATENT DOCUMENTS

| | | |
|---|---|---|
| CN | 101042681 A | 9/2007 |
| CN | 101789058 A | 7/2010 |

(Continued)

OTHER PUBLICATIONS

Dewan P., et al., "A Hypervisor-Based System for Protecting Software Runtime Memory and Persistent Storage," Proceeding of the 2008 Spring Simulation Multiconference, Apr. 14, 2008, pp. 828-835.

(Continued)

*Primary Examiner* — Beemnet Dada
(74) *Attorney, Agent, or Firm* — Nicholson De Vos Webster & Elliott LLP

(57) ABSTRACT

Embodiments of systems, apparatuses, and methods to protect data stored in a storage system of a device from malware alternation are described. In some embodiments, a system receives an indication that the data is to be protected. In addition, the system further triggers an interrupt of the device and secures the data from the malware alternation.

4 Claims, 25 Drawing Sheets

(56) References Cited

U.S. PATENT DOCUMENTS

| | | | |
|---|---|---|---|
| 7,571,483 B1 | 8/2009 | Bascle et al. | |
| 8,572,399 B2 * | 10/2013 | Rodgers | G06F 21/572 713/1 |
| 9,172,538 B2 * | 10/2015 | Obaidi | H04L 9/28 |
| 9,390,278 B2 * | 7/2016 | Scouller | G06F 21/6218 |
| 2002/0173299 A1 | 11/2002 | Buchholz et al. | |
| 2003/0023822 A1 | 1/2003 | Scott et al. | |
| 2008/0141371 A1 | 6/2008 | Bradicich et al. | |
| 2008/0178294 A1 | 7/2008 | Hu et al. | |
| 2008/0267399 A1 | 10/2008 | Medvinsky et al. | |
| 2009/0282485 A1 | 11/2009 | Bennett | |
| 2014/0047174 A1 * | 2/2014 | Sakthikumar | G06F 12/1425 711/105 |

FOREIGN PATENT DOCUMENTS

| | | |
|---|---|---|
| TW | 200836064 A | 9/2008 |
| WO | 0049753 A2 | 8/2000 |

OTHER PUBLICATIONS

European Search Report in corresponding matter Application No. 11877791.1 dated Nov. 17, 2015, 9 Pages.

Notice of Allowance from Taiwan Patent Application No. 101144311 dated Aug. 31, 2015 2 pages.

Partial Supplementary European Search Report for Application No. 11877791.1, dated Jul. 30, 2015, 6 pages.

PCT "International Preliminary Report on Patentability" Application No. PCT/US2011/067029 dated Jun. 24, 2014 5 pages.

PCT "Notification of Transmittal of the International Search Report and the Written Opinion of the International Searching Authority or the Declaration" Application No. PCT/US2011/067029 dated Jul. 30 2012 9 pages.

Search Report of R.O.C. Application No. 101144311 dated Jan. 13, 2015 1 page.

Taiwanese Application No. 101144311 Official Letter and Search Report, 8 pages. (Jan. 23, 2015).

* cited by examiner

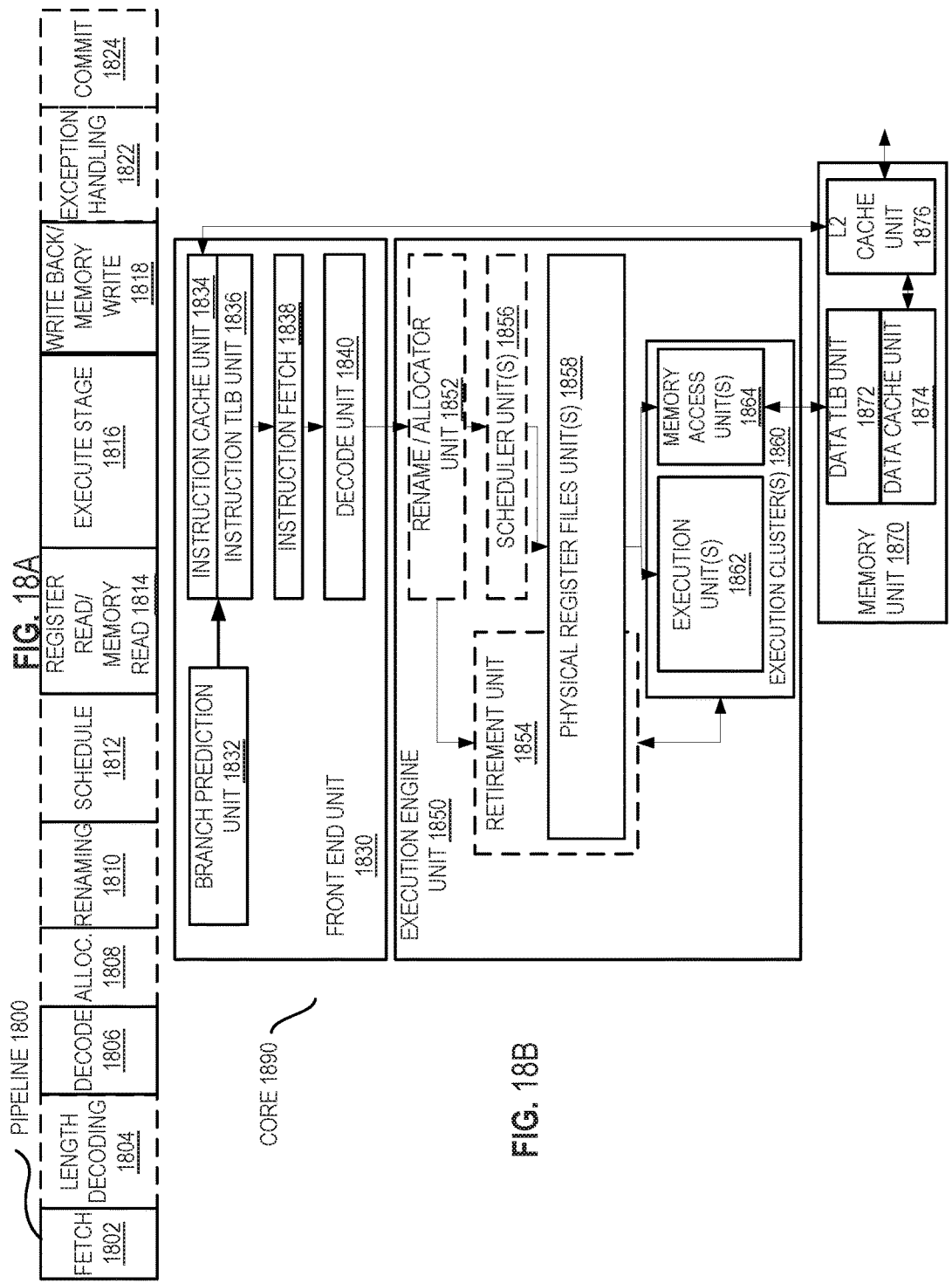

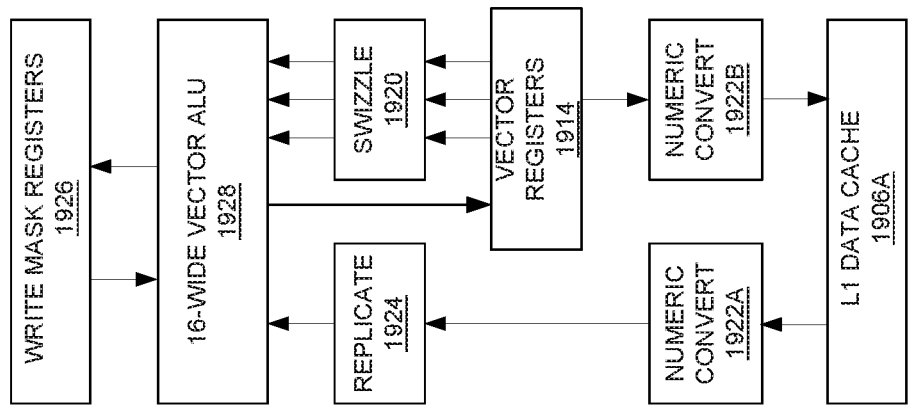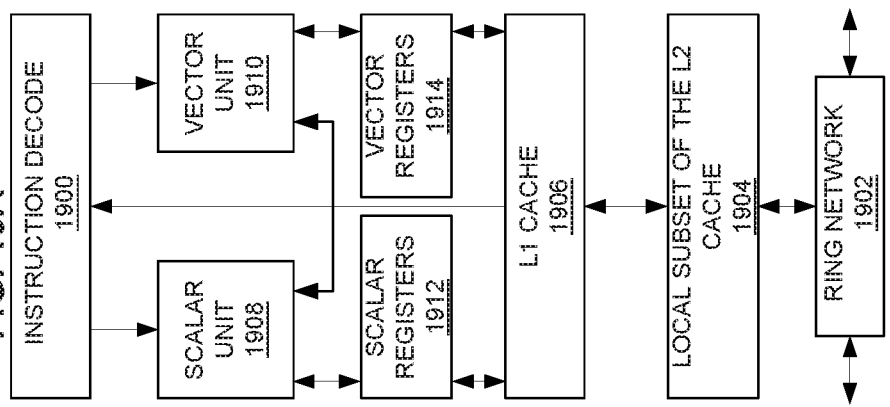

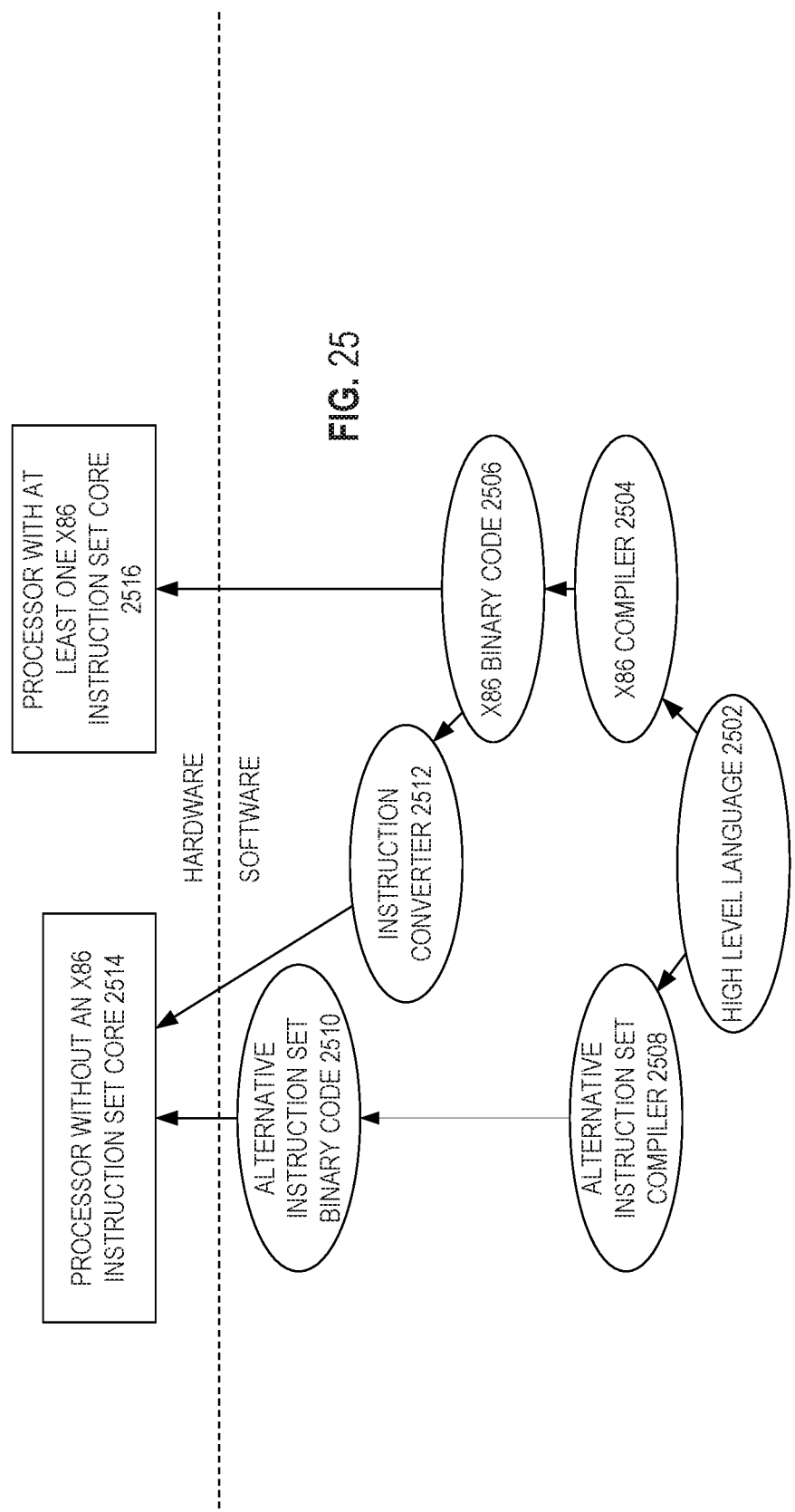

ID OF INVENTION

The field of invention relates generally to storage devices, and, more specifically, to structure and uses of secure storage.

BACKGROUND

Today, host side applications (e.g. antivirus software) use an operating system application programming interface (API) to read in data (e.g. malware definition data) from storage to detect malware. Additionally, other storage specific commands can be used to read, write, and otherwise manage stored data. For example, vendor specific commands, SMART Command Transport (SCT), negative logical block addresses (LBA), etc., can be used to process stored data. However these methods can be easily subverted by malware to give wrong information to the caller. In addition, there is no provision for configuring the methods to provide application specific protection. Furthermore, data that is stored in can easily be attacked by malware, or that stored content that is protected by digital rights management (DRM) may be copied or altered. In addition, storage coupled to a computer may offer additional services that are not easily activated in the field.

BRIEF DESCRIPTION OF THE DRAWINGS

The present invention is illustrated by way of example and not limitation in the figures of the accompanying drawings, in which like references indicate similar elements and in which:

FIG. 18A is a block diagram illustrating an exemplary in-order pipeline and an exemplary register renaming, out-of-order issue/execution pipeline according to embodiments of the invention.

FIG. 18B is a block diagram illustrating an exemplary embodiment of an in-order architecture core and an exemplary register renaming, out-of-order issue/execution architecture core to be included in a processor according to embodiments of the invention.

FIGS. 19A and 19B are block diagrams illustrating an exemplary in-order core architectures according to embodiments of the invention.

FIG. 25 is a block diagram contrasting the use of a software instruction converter to convert binary instructions in a source instruction set to binary instructions in a target instruction set according to embodiments of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Storage Tunnels

Figure 1:
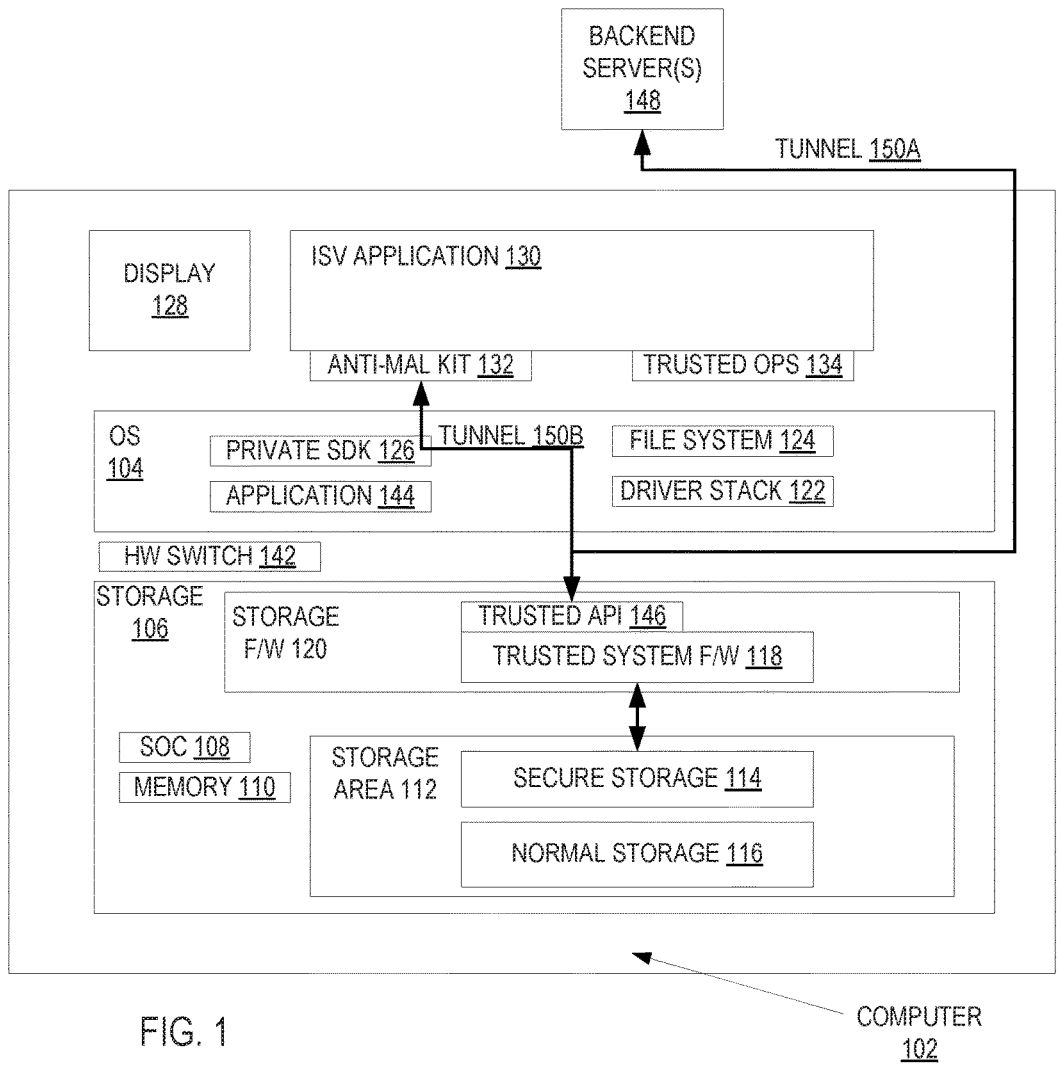
FIG. 1 illustrates an example of a system that includes secure storage.

As described above, malware can attack stored data and can subvert operating system calls to a storage system. Described below is a system that creates a secure tunnel between an application and a secure storage system that hides the data storage by encrypting the data communicated to the secure storage system and storing data beyond the accessibility of an operating system. FIG. 1 illustrates an example of a system 102 that includes secure storage 114. In FIG. 1, computer system 102 includes storage system 106, operating system 104, independent software application 130, display 128, and hardware switch 142. In one embodiment, the computer 102 is coupled to backend servers 148, where the backend servers 148 are used to authorize storage features or to download premium content (e.g., content managed by a digital rights management scheme). In one embodiment, the operating system 104 is used to control the execution of one or more processes and/or applications for the computer 102. Examples of an operating system 102 is known in the art (Microsoft Windows, Apple Macintosh OS X, etc.) In one embodiment, the operating system 104 includes a private software developer's kit (SDK) 126, filesystem 124, driver stack 122, and application 144. In one embodiment, the filesystem 124 is a filesystem that is known in the art that is used to manage files that are stored in storage 106. For example and in one embodiment, a filesystem 124 is a way to organize data in storage 106 using driver stack 122. In one embodiment, the driver stack 122 is a set of driver(s) that is used to operate with storage 106. The driver stack 122 may include multiple software layers in the form of drivers that take on different functional roles and act as an overall interface between an application/process and one or more storage devices.

Application 144 is an application that runs in the operating system 104. One example of an application can be e-mail client, word processor, image management, media management, anti-virus, operating system functions, etc., or any other type of application as known in the art. As is known in the art, each application may interact with the storage system 106 using the filesystem 124, and driver stack 122.

In one embodiment, the storage 106 includes storage firmware 120, system-on-a-chip (SOC) 108, memory 110, and storage area 112. In one embodiment, the storage can be any type of storage known in the art (solid state drive (SSD), hard disk (HD), flash drive (FD), etc.). In one embodiment, the system-on-a-chip 108 is a chip that includes a processor and other circuits that are used to support the storage 106. An example of a SOC 108 is further described below in FIG. 21 below. In one embodiment, memory 110 is memory used to temporarily store data. The storage firmware 120 is firmware that is used to operate and manage the different functions of the storage 106.

In one embodiment, the storage includes a trusted application programming interface (API) 146 and a trusted system firmware 118. In one embodiment, the trusted API 146 is used by processes executing in the operating system or ISV application 130 to access the secure storage of 114 of storage area 112. In one embodiment, the secure storage 114 is not visible to the operating system through the filesystem 124 and driver stack 122. Instead the secure storage 114 is accessed using the trusted API 146. Trusted system firmware 118 is firmware that is used to manage the secure storage 114. In this embodiment, the trusted API 146 is used by local or remote entities to create a tunnel between that entity and the secure storage. A tunnel is used to securely transmit information between an entity and the secure storage. For example one embodiment, the ISV application creates a tunnel 150B via trusted API 146 and trusted system firmware 118 to secure storage 114.

In one embodiment, the secure storage 114 is used to store important data (e.g. anti-virus definition files, digital rights managed content, financial data, operating system components etc.), enabling storage features, or securely downloading data outside of the operating system, or any other types of secure storage. In one embodiment, the secure storage 114 stores data that is invisible to the operating system. For example and in one embodiment, the secure storage 114 is at storage addresses that are beyond the maximum addressable storage available to the operating system and/or applications that are accessing the storage 106 via the filesystem 124 and driver stack 122. While in one embodiment, the secure storage 114 is physically separate from the normal storage 116, in an alternate embodiment, the secure storage 114 is a partition of the normal storage 116.

In one embodiment, the storage area 112 includes secure storage 114 and normal storage 116. In one embodiment, the normal storage 116 is the storage that is accessed by the operating system 104 and has the filesystem 124 defined on top of this normal storage 116. In this embodiment, the operating system 104 accesses files and/or other data in the normal storage 116 through the driver stack 122. For example and in one embodiment, application 144 (or other applications that are operating system) can access files in the normal storage 116 via the filesystem 124 and driver stack 122.

As described above, the data in the secure storage 114 is not visible to an application except through the trusted API 146. In one embodiment, the ISV application 130 accesses the secure storage 114 using the tunnel 150B (via the anti-malware kit 132, private SDK 126, trusted API 146, and trusted system firmware 118). For example and in one embodiment, the ISV application 130 is an agent that can securely download a premium content that is managed by digital rights management using the anti-malware kit 132 and trusted ops 134. In one embodiment, the trusted ops 134 are trusted operations with secure storage 114, such as a trusted read and/or trusted write. In this embodiment, a trusted read/write means that the identity of the entity requesting the operation is known and trusted. In another embodiment, application 130 is an agent that is authorized to securely communicate data with the secure storage 114 using a tunnel as described below.

As described above, the data stored in the secure storage 114 is invisible to the operating system 104 or an application executing in the operating system 104. Thus, neither the operating system 104 nor the application 144 can view, alter, or delete the data stored in secure storage 114. In one embodiment, this scheme is used to secure data from potential malware that may want to change, alter, or delete the data stored in secure storage 114.

For example and in one embodiment, data such as the master boot record of the operating system 104 or other important operating system 104 components can be stored in the secure storage 114 and locked such that a potential malware work cannot read, alter, or delete these important operating system components. In another embodiment, important user data such as anti-virus definition data, financial data, etc. can be stored in the secure storage 114, thus preventing malicious processes (e.g., malware, virus, etc.) from accessing, altering, or deleting the important user data. In one embodiment, the user data is data that is not part of the operating system.

As described above, a tunnel can be formed between an application (e.g., ISV application 130) and the secure storage 114 through private SDK 126, trusted API 146, and trusted system firmware 118. As will be described later, this tunnel can be formed in two ways: (1) through a mailboxing scheme in which logical block addresses are set aside for communication between the application and the storage system, or (2) the tunnel can be formed based on a trusted sends and receives that are supported by the storage system. While in one embodiment, a tunnel 150A is formed between the secure storage 114 and an application running on the same computer that includes the secure storage 114, in another embodiment a tunnel 150B can be formed between the storage system with a backend server 148 that is coupled to the computer 102 across a network. In this embodiment, trusted system firmware 118 (via trusted API 146) creates its own network connection that is used to communicate information with the backend server 148. For example and in one embodiment, trusted storage firmware 118 can be used to create a tunnel such that the backend server(s) 148 can download DRM content to the secure storage 114 of storage 106. This is described further in FIGS. 7-10 below.

Figure 2A:
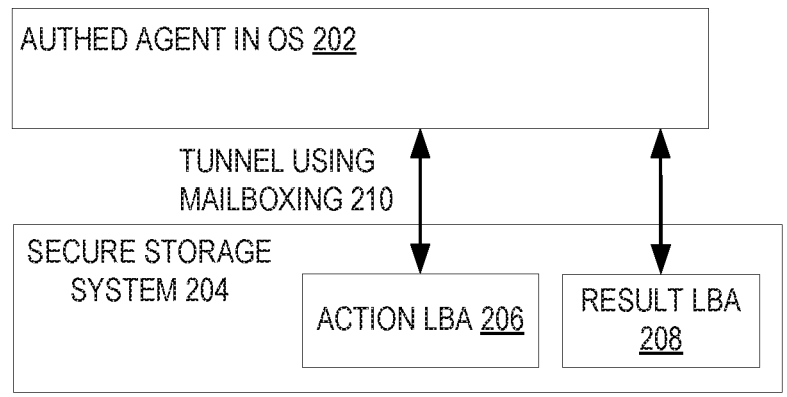
FIGS. 2A and B illustrate examples of an agent that communicates information to a secure storage system using a tunnel.

As described above, FIGS. 2A and 2B illustrate examples of an agent that communicates information to a secure storage system using a tunnel. In FIG. 2A, an authorized agent (that is executing the operating system) 202 securely communicates with secure storage system 204 using a mailboxing-based tunnel. In one embodiment, the secure storage system 204 is a secure storage as described in FIG. 1, block 114 above. In one embodiment, the agent 202 is authorized to communicate with secure storage 204. In one embodiment, the tunnel is based on a mailbox in scheme, in which requested actions of the secure storage system 204 are written to a dedicated area in the secure storage system 204, action logical block address (LBA) 206. The results of the requested actions are communicated using the results LBA 208, which is a dedicated area of secure storage system 204. In one embodiment these logical block addresses are beyond the maximum addressable storage. A storage address that is below a maximum storage address can be seen by operating system such as operating system 104 as described in FIG. 1. Because both of the LBAs 206 and 208 are above the maximum address space that is accessible by an operating system, these LBAs (and the data stored at the LBAs) are invisible to the operating system.

In this embodiment, the agent 202 can access the data or write to the data from these LBAs by using the tunnel 210. As will be described further below, the action LBA 206 is used to communicate action requests to the storage system 204. In one embodiment, these action requests can include write, read, and/or tunnel configuration commands or other commands as known in the art for accessing or managing data in a storage system. The results of these commands are stored in the results LBA 208.

For example and in one embodiment, the agent 202 wishes to write data to the secure storage system 204. In this embodiment, the agent 202 writes a write command to the action LBA 206 and the data the agent wishes to store is written into the results LBA 208. The secure storage system 204 processes the command stored in the action LBA 206 and stores the data in into the location indicated in the action LBA 206 by redirecting the data being written to results LBA 208. In another embodiment, the agent 202 wishes to read data from secure storage system 204. In this embodiment, the agent 202 writes the read command into action LBA 206. The secure storage system 204 processes the read command and redirects the data to be read as if coming from the result LBA 208. The agent 202 reads the data from result LBA 208 to complete the read command. In one embodiment, the mailboxing based tunnel 210 can be built upon many different storage protocols (e.g., trusted send/receive, overloaded write/read, Common Storage Management Interface (CSMI), etc.). The agent communicating with the secure storage system using a mailboxing tunnel is further described FIGS. 3A-6 below.

Figure 2B:
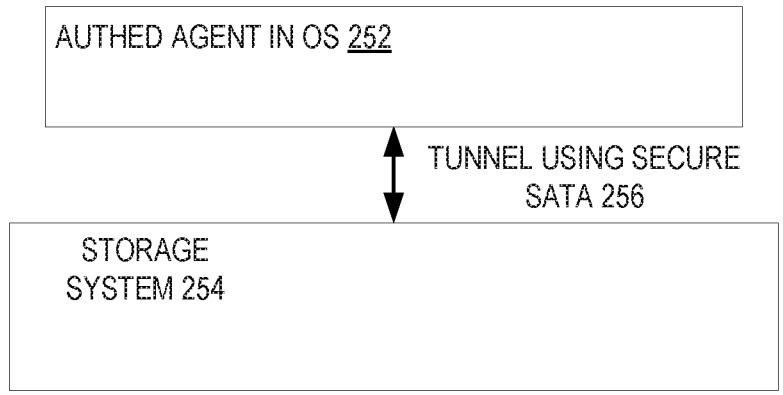

As described above, the secure storage systems can use a tunnel based on a trusted send messaging system with the agent. In FIG. 2B, an agent authorized in an OS 252 securely communicate with a secure storage system 254 using a tunnel 256 based on a trusted send facility. In one embodiment, the tunnel 256 can be based on the trusted send facility of secure SATA. In this embodiment, the agent in the secure storage system 254 would negotiate a session key with the secure storage system 254 that can be used for transmitting the messages back and forth. In one embodiment, the negotiated session key is used to encrypt/decrypt the data stored in each message transmitted using the tunnel 256. An agent 252 communicating information with the secure storage system 254 using a trusted send type tunnel 256 is further described in FIG. 7 below.

Figure 3A:
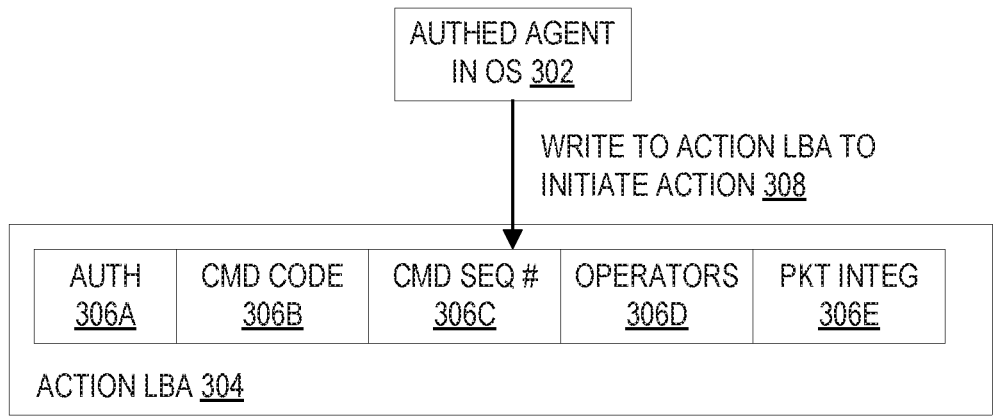
FIGS. 3A and B illustrate example of an agent communicating information to a secure storage system using mailboxing.
Figure 3B:
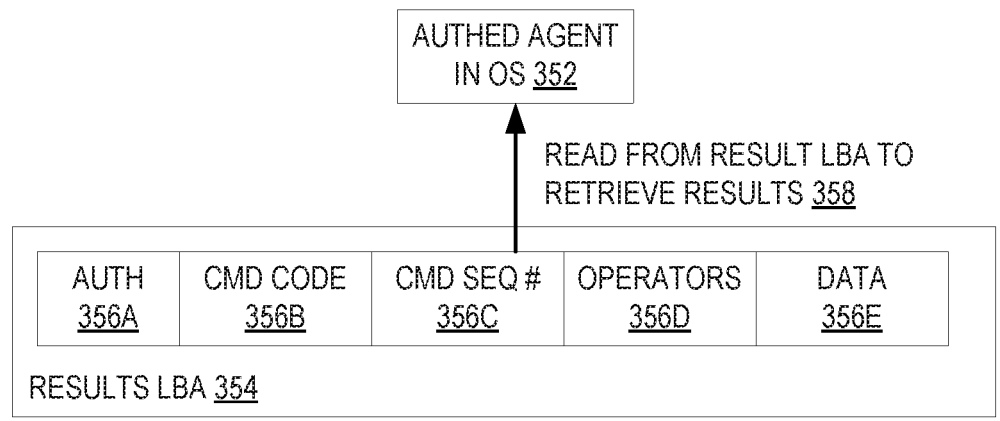

FIGS. 3A and 3B illustrate example of an agent communicating information to a secure storage system using mailboxing. In FIG. 3A, an agent authorized in the OS 302 writes a command to action LBA 304 to initiate an action 308 with the secure storage. In one embodiment, the action written to action LBA 308 contains several fields: authorization message field 306A, command code 306B, command sequence number 306C, operators 306D, and package integrity 306E. In one embodiment, the authorization message field 306A includes data that is used to identify and authorize the action requested by the agent 302. For example and in one embodiment, the authorization message field 306A includes a private key that is specific for the data communicated between the agent 302 and the secure storage.

In one embodiment, the command code 306B is a code that indicates what type of command is being written to the action LBA 304. For example and in one embodiment, the command code can be a code that write, read, configure, and/or some other command code use to indicate another type of action that it would be used between an agent and a storage system for accessing or managing the data stored in the storage system. In one embodiment, the command sequence number 306C is a number that can be used to identify a specific command message. In one embodiment, the operators 306D are flags or bits that signal the firmware to take some kind of specific action associated with a given command type. In one embodiment, packet integrity 306E is data that is used to ensure the integrity of the data written to action 308A. For example and in one embodiment, the data in packet integrity 306E can be a checksum or some other form of data that ensures that the data was correctly written to action LBA 304.

In FIG. 3B, the agent authorized in the OS 352 reads the data from results LBA 354 to retrieve the results 358 from an action written to an action LBA. In one embodiment, the results LBA 354 has fields authorization message 356A, command 356B, command sequence 356C, operators 356D, and data 356E. In one embodiment, authentication message 356A, command code 356B, command sequence 356C, and operators 356D perform the same function as described above in FIG. 3A. Furthermore, in one embodiment, data 356E is used to communicate data that results from the action that was originally written to the action LBA. In another embodiment, the data from the results is retrieved differently (e.g., directly through the secure tunnel, etc.). For example and in one embodiment, data 356E includes the data that is retrieved from a read. In other embodiments, data 356E can include other data such as a return code, error code or other type of data that would be communicated as a result of command written to the action LBA.

Figure 4:
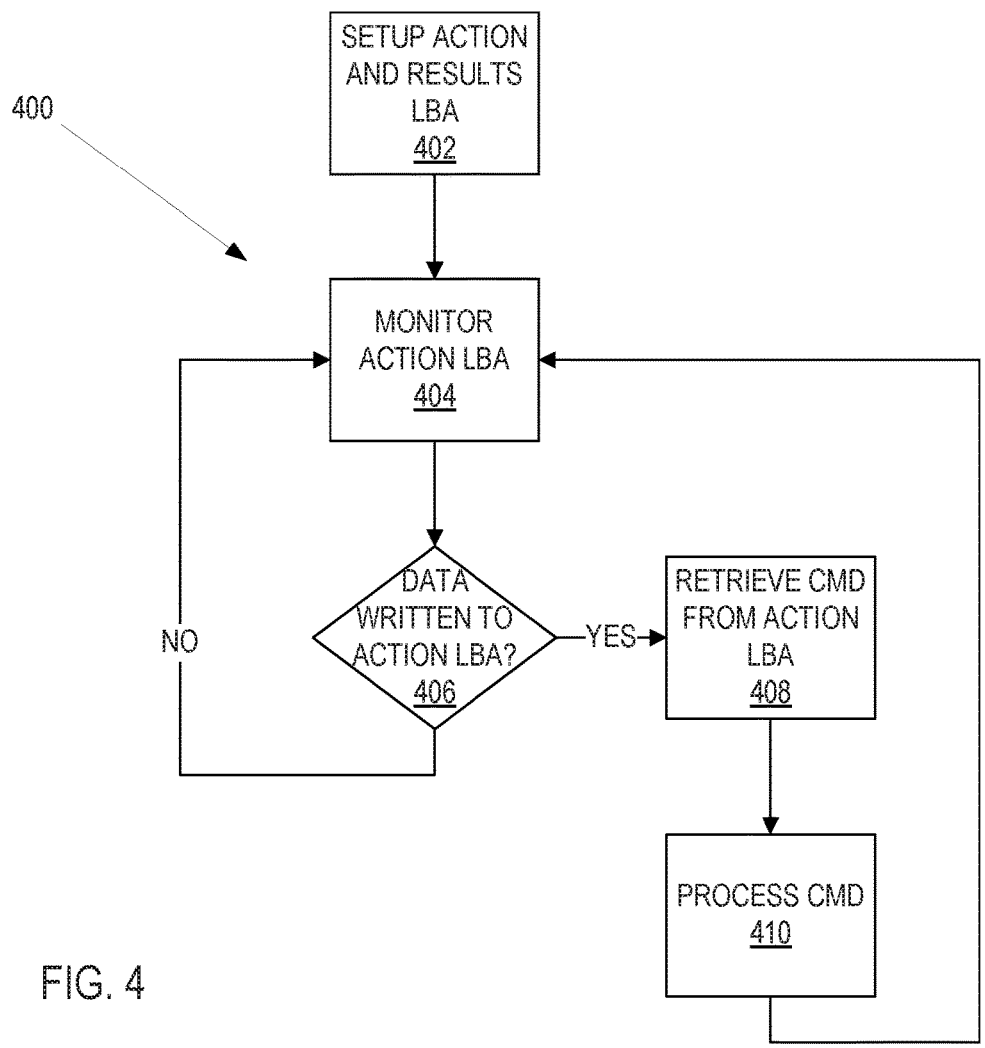
FIG. 4 illustrates an embodiment of a method for communicating information with an agent using mailboxing.

FIG. 4 illustrates an embodiment of a method 400 for communicating information with an agent using mailboxing.

In one embodiment, method 400 is executed by a secure storage system (e.g., secure storage 114 as described above in FIG. 1) to process commands written to an action LBA. In FIG. 4, method 400 begins by setting up the action and results LBA at block 402. In one embodiment, method 400 configures the action and result LBA for communication with an agent that is authorized to communicate with the secure storage. For example and in one embodiment, the method 400 configures an action LBA and result LBA that are beyond the maximum read of maximum addresses that an operating system can access. By having the action and results LBAs invisible to the system, any agent that wishes to communicate information via the action results LBA is required to go through an alternate channel of communication such as a tunnel to use the action and result LBAs. In one embodiment, method 400 uses a different pair of the action and results LBA for a different agent that wishes to communicate with the secure storage. In another embodiment, method 400 sets up an action and result LBA that can be used more than one agent.

At block 404, method 400 monitors the action LBA to determine if an action has been written to the action LBA in order to initiate an action with the secure storage system. In one embodiment, an agent writes an action (e.g. to the action LBA 304 as in FIG. 3A above) to do a read, write, or other type of action with the secure storage system. In one embodiment, method 400 monitors the action LBA by scanning and analyzing incoming commands for specific bit patterns. At block 406, method 400 determines if data is written to the action LBA. If data has been written to the action LBA, at block 408, method 400 retrieves the command that was written to the action LBA. In one embodiment, the data written to the action LBA has a data structure such as fields 306A-E as described above in FIG. 3A. Method 400 processes the retrieved command at block 410. Processing the retrieved command written to the action LBA is further described in FIG. 5 below. Execution proceeds to block 404 above. If no data has been written to the action LBA at block 406, execution proceeds to block 404 above.

Figure 5:
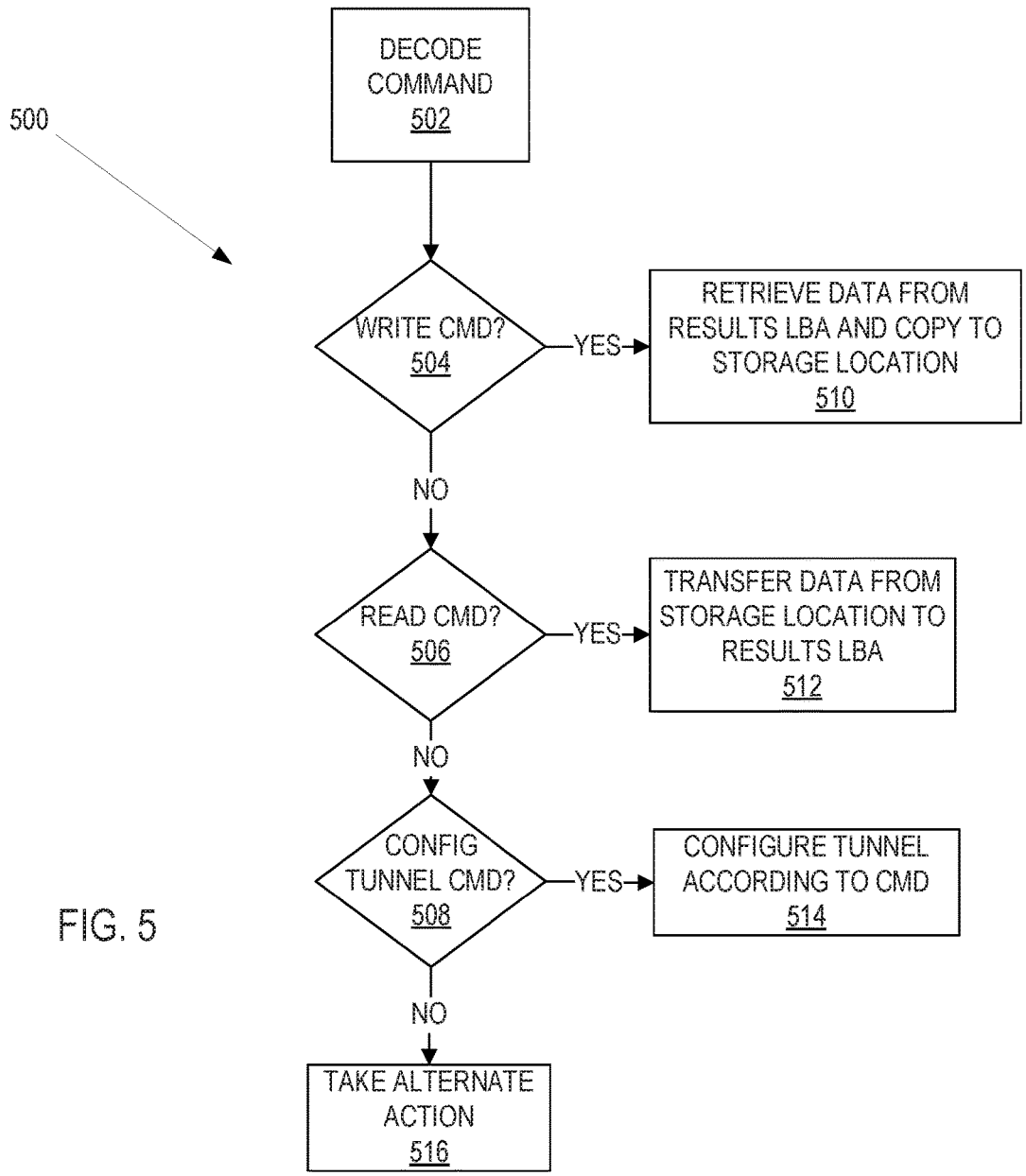
FIG. 5 illustrates an embodiment of a method for processing mailboxing communication commands.

FIG. 5 illustrates an embodiment of a method 500 for processing mailboxing communication commands. In one embodiment, method 500 is executed by method 400 at block 410 above. In FIG. 5, method 500 begins by decoding the command at block 502. In one embodiment, method 500 decodes the command by retrieving the authorization message from the command. In one embodiment, method 500 determines if the command is authorized by analyzing the authorization message. In one embodiment, if the authentication fails, the message is ignored, and if the authentication is found to be valid, the message is acted upon. For example and in one embodiment, method 500 retrieves the authentication message from command and validates the message as being a valid message received from the authorized agent. In one embodiment, each agent that communicates with secure storage system has a unique set of authentication credentials that is used to identify the agent and to encrypt/decrypt the contents of a command and results. Furthermore, method 500 uses the authentication message to decrypt the data in the command. If the command is authorized, method 500 segments the command into separate fields as described in FIG. 3A above.

At block 504, method 500 determines if the command is a write command. In one embodiment, method 500 determines the type of command by reviewing the data in the command code field (e.g., command code field 306C as described in FIG. 3A above). If the command is a write command, at block 510, method 500 directs the data that is to be written in the results LBA to the storage location indicated in the command. For example and in one embodiment, the agent wishes to write data to sector 2000 of the secure storage system. In this example, the agent writes a command to the action LBA that data is to be stored at sector 2000. Furthermore, method 500 decodes the command as a write command to determine that the data to be written to the results LBA is to be written to sector 2000. Method 500 detects this write to the results LBA and redirects this data being written to the results LBA to sector 2000 of the secure storage system.

If the command is not a write command, at block 506, method 500 determines if the command is read command. In one embodiment, method 500 determines if the command is a read command by interrogating the command code of the command. If so, method 500 redirects the read from the results LBA to the storage location at block 512. For example and in one embodiment, if the read command is to read data from sector 1000 of the secure storage system, method 500 decodes the command to determine that the read is from sector 1000 and also amount of data that is to be read. Method 500 redirects the incoming read of the results LBA to read the correct amount of data from sector 1000 to the results LBA. In this example, the agent that initiated the read command reads the data from the results LBA and method 500 redirects this read from the desired sector.

If the command is not a read command, at block 508, method 500 determines if the command is a configure command. If this command is a configure command, method 500 configures the tunnel according to the data in the command. If the command is not a configure tunnel command, at block 516, method 500 takes alternative action. In one embodiment, the method 500 could ignore the command, store an error code in the results LBA indicating the command is not understood, or take another action as known in the art.

As stated above, there are two different ways that the agent and a secure storage system could use a tunnel to communicate information between the agent and the secure storage system. One way, as described above, is based on mailboxing scheme that uses an action and results LBA to securely communicate information between the agent and the secure storage system. This type of scheme can be used by many different storage communication protocols as known in the art (SATA, ATA, e-SATA, Universal Serial Bus (USB), Thunderbolt, PCI, etc.). Another way is to set up a tunnel between an agent in the secure storage using trusted send and receive facility ("trusted send facility") of the storage communication protocol. In one embodiment, the agent and the secure storage system use the trusted send facility of the secure SATA protocol to negotiate a session key between the agent and the secure storage system.

Figure 6:
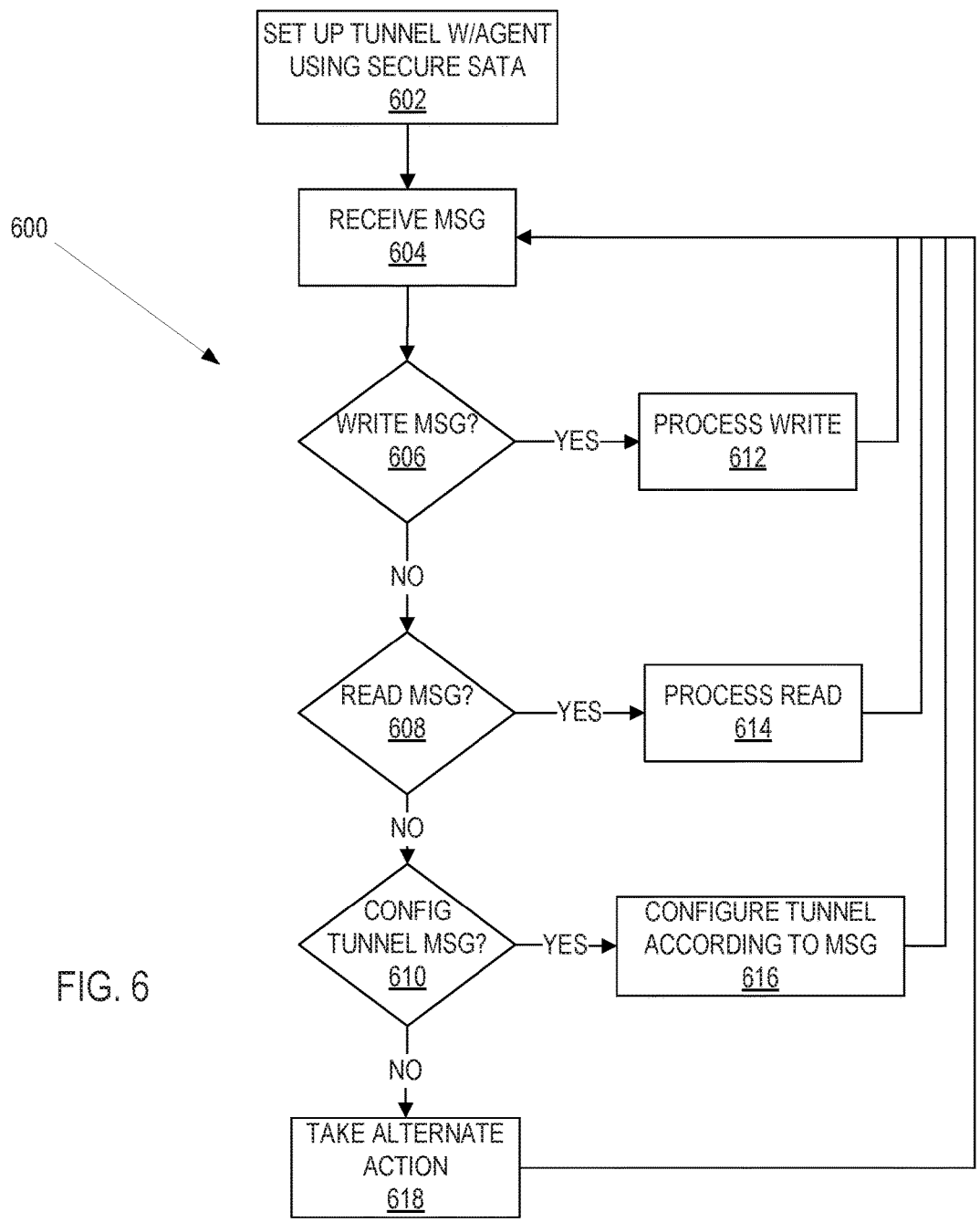
FIG. 6 illustrates an embodiment of a method for processing tunnel messages that are transmitted using secure Serial Advanced Technology Attachment (SATA).

FIG. 6 illustrates an embodiment of a method for processing tunnel messages that are transmitted using secure Serial Advanced Technology Attachment (SATA). In one embodiment, method 600 is executed by the secure storage system (e.g., secure storage 114 of FIG. 1, above) to securely communicate information with an agent. In FIG. 6, method 600 begins by setting up a tunnel with agent using the secure SATA trusted send facility at block 602. In one embodiment, the agent would negotiate a session key with method 600 that is unique to that agent and method 600, such that data can be securely communicated between the agent and method 600 is using the session key. In one embodiment, the session key is used to identify the agent to method 600 and to encrypt/decrypt the data communicated using the tunnel. While in one embodiment, method 600 uses the trusted send facility of the secure SATA, in alternate embodiments, another storage protocol that offers a trusted send facility can be used to set up a tunnel between the agent and the secure storage system.

At block 604, method 600 receives a message from the agent. In one embodiment, the message includes the authentication data that identifies the message as originating from the agent and includes on authentication credentials such as the session key that can be used to decrypt the data in the message. For example and in one embodiment, the message can include the authentication data such as negotiated session and the data that is encrypted using that key. Furthermore, at block 604, methods 600 decrypts the data contained in the message so that method 600 can further process the received message.

At block 606, method 600 determines if the received message is a write message. If so, method 600 processes the write message at block 612. In one embodiment, method 600 processes the write message by determining which data is to be written and where the data is to be written to and writing that data using the location and data to be written from the message. For example and in one embodiment, if the write message indicates that the 100 bytes of data is to be written to sector 2000 of the secure storage system, method 600 retrieves the 100 bytes of data from the message payload and stores that 100 bytes of data to sector 2000 of the secure storage system. In addition and in one embodiment, method 600 sends a message back to the agent via the tunnel indicating the results of the write (e.g., success, failure, etc.).

If the received message is not a write message, at block 608, method 600 determines if the received message is a read message. If the received message is read message, at block 614, method 600 processes the read message. In one embodiment, method 600 retrieves the location of the read and that the amount of data to be read from that location. For example and in one embodiment, methods 600 receives a read message that indicates that the 200 bytes of data should be read from sector 1000 of the secure storage system. In this embodiment, method 600 would read 200 bytes of data from sector 1000. Furthermore, method 600 sends a message back to the agent with the 200 bytes of data that was read from sector 1000. In this embodiment, method 600 encrypts the data using the negotiated session key and stores this encrypted data in the message to be sent back to the agent. In addition, method 600 sends that data back to the agent using the formed message.

If the message received at block 604 was not a read message, at block 610, method 600 determines if that received message is a configure tunnel message. If the received message is a configure tunnel message, at block 616, method 600 configures the tunnel according to configuration parameters in the message. In one embodiment, after configuring the tunnel according to the received configuration tunnel message, method 600 sends a return message back to the agent indicating the success or failure of the command in that message. If the received message is not a configure tunnel message, at block 618, method 600 alternative action (e.g., drops the received message, sends a message back indicating the received message is not understood, etc.).

Lockable Storage

FIGS. 7-10 describes a system and methods for locking storage at the storage device level so that the stored data cannot be altered by a process (e.g., malware, virus, etc.) that may be executing in the operating system. For example, if a user wanted to open a file or access data that the user does not trust (e.g., e-mail attachments, executables from unknown websites, etc.), how can a user ensure that the file or data does not infect or otherwise damage the existing stored data? The user may not trust many applications or executables because malware is readily present in downloaded data. The user may have personal data they want to protect when operating in an insecure environment such as while opening untrusted files.

When in insecure areas, some users may turn off a computer's wireless network card in order to prevent being attacked by malicious hackers nearby. Similarly, with malware on a system, a user may want to be able to open untrusted files while at the same time having personal, sensitive data inaccessible or locked. Thus a "data safe mode" is useful, such as the ability to have an external switch on your laptop to lockdown key assets on a system (Operating System files, configurable data such as credit card information, passwords and other sensitive private information) or locking down key components of an operating system during boot time.

Figure 7:
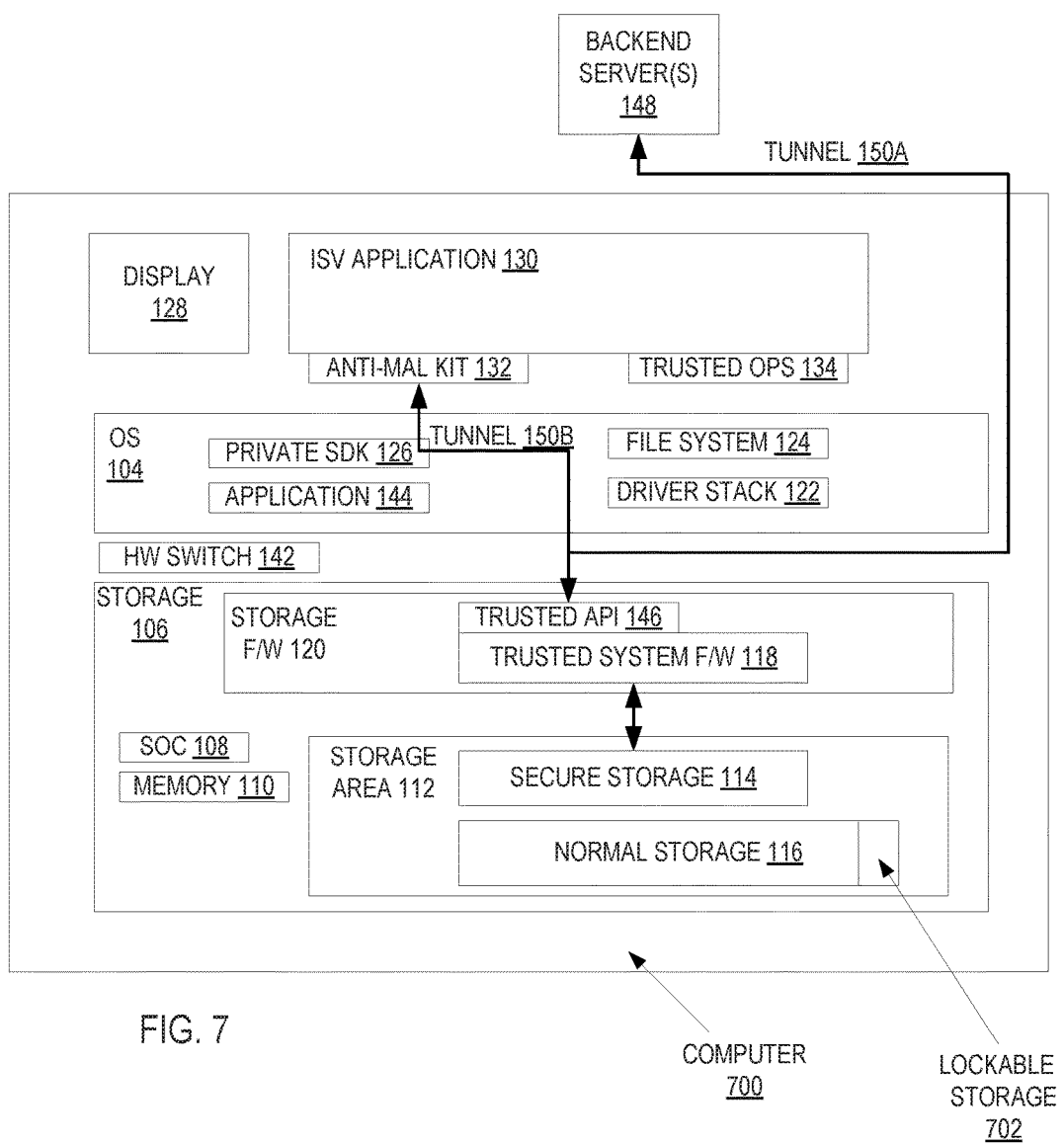
FIG. 7 illustrates an example of a system that includes lockable storage.

FIG. 7 illustrates an example of a system that includes lockable storage. In FIG. 7, computer 700 is similar to computer 102 as in FIG. 1, except that the computer 700 includes lockable storage 702 that can be locked so as to prevent the data stored in the locked region. In one embodiment, the lockable storage is part of the normal storage 116. In another embodiment, the lockable storage is part of the secure storage 114. In one embodiment, the lockable storage is used to store important operating system components (Master boot record, drivers, other operating system files, etc.). In another embodiment, a user may store data in a lockable storage such as antivirus data definition, financial records, personal items (photos, etc.), and/or other important data.

For example and in one embodiment, there can be two types of storage, a secure storage and modification locked storage. In one embodiment, the secure storage itself consists of two modes: fixed, always on secure storage that is inaccessible to normal users and hidden via normal methods of storage access (e.g., operating system calls to storage); and there is configurable secure storage in normally addressable ranges of a drive. The configurable secure storage in normally addressable ranges of the drive would be specific LBA ranges that have been configured by the user as to which parts of the drive to protect. In one embodiment, either type of secure storage disallows normal writes and reads with this type of storage whereas, authenticated reads or writes are allowed with the secure storage.

As another example and in another embodiment, for modification locked storage, anyone can read the data in that region, but only an authenticated entity (to the drive, for that region) can modify (e.g., write to) the data in that region. In this embodiment, the lockable storage would be configurable ranges of either secure storage or modification locked storage because the fixed the secure storage is inaccessible to normal users anyways. In a further embodiment and in addition to the locking storage, a physical switch (e.g., hardware switch 142 for FIG. 1 above) could be employed to make an "always on" secure storage inaccessible even to authenticated users while the switch is on. In one embodiment, locking down secure storage to all others is actually is a useful feature because a lot of malware can attack other, potentially (normally) trusted applications that may have access to the secure store.

In one embodiment, two ways to lock the lockable storage are possible. In one embodiment, the user can initiate the lock by using a switch that is outside the control of the operating system. In this embodiment, this action creates a system interrupt that would be communicated via trusted API 146 and trusted firmware 118 to lock the lockable storage 702. As described above, this could be used to lock important user files such as antivirus data files, financial files, and personal files. The user locking mechanism is further described in FIG. 10 below. In another embodiment, data in the lockable storage can be locked down by the operating system. In one embodiment, the operating system selectively locks different parts of lockable storage during boot time. This embodiment can be used to lock down important operating system data (including master boot record, and other important operating system components) during the computer boot time.

Figure 8:
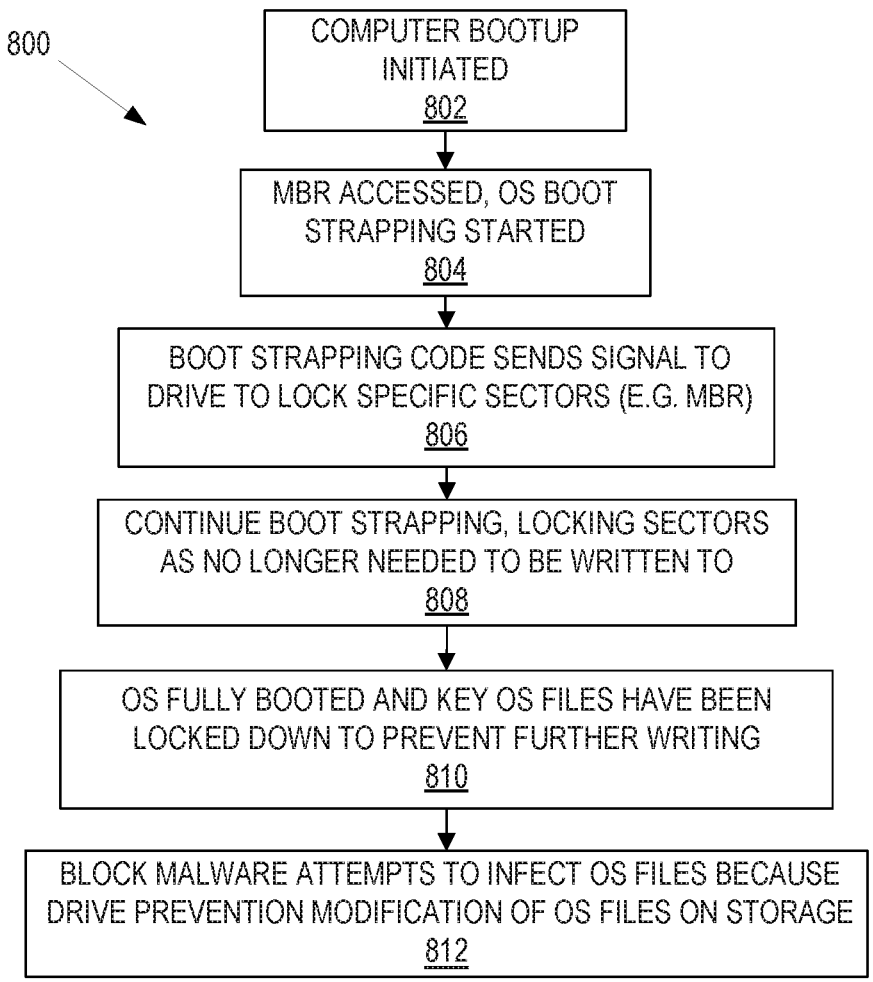
FIG. 8 illustrates an embodiment of a method for selectively locking operating system assets stored in lockable storage.

FIG. 8 illustrates an embodiment of a method for selectively locking operating system assets stored in lockable storage. In FIG. 8, method 800 begins by initiating the computer bootup sequence. In one embodiment, the computer boot sequence is a sequence of actions that bring a computer from downstate to a fully operational state. At block 804, method 800 accesses the master boot record of computer and starts the boot strapping process. In one embodiment, the master boot record (MBR) contains information that is used for bootstrapping the operating system. In one embodiment, the MBR is a single sector of 512 bytes.

At block 804, method 800 sends a signal to the secure storage system to lock the master boot record. In one embodiment, method 800 locks the sector of the lockable storage that stores the master boot record. By locking the specific sectors that store the master boot record, these sectors (and the master boot record itself) cannot be altered via processes executing in the operating system such as malware. In another embodiment, the boot sequence is based on a user extensible firmware interface (UEFI). In this embodiment, UEFI is another way to boot up a system. UEFI is similar to the MBR-based boot up, but there is more involved. In UEFI, to boot up, there is a boot manager, which boots the system up. Fir example, UEFI boot up uses the a Globally Unique Identification (GUID) Partition Table (GPT) which is similar to a MBR, but it is a different format and rather than being a single sector (e.g., LBA 0 for MBR), a GPT takes up 34 or 35 sectors at the beginning and 34 or 35 sectors at the end of the drive. In this embodiment, method 800 would lock the relevant sectors storing the GPT at block 802.

Method 800 continues the boot strapping process and selectively locking sectors storing the operating system components, as the operating system components are no longer needed to be written to, at block 808. In one embodiment, there is a plurality of important operating system components that could be stored in lockable storage and each of these operating system components can be stored in the same or different sector of the lockable storage. The plurality of important operating system components can include the entire operating system or a subset of the operating system. As these operating system components are used and are not needed to be written to, method 800 locks the sectors associated with the operating system components. In one embodiment, method 800 locks these sectors by sending a signal to the storage system that certain sectors of the lockable storage need to be locked. In one embodiment, the method 800 sends the signals via a tunnel as described with reference to FIGS. 1-6 above.

At block 810, method 800 determines that the operating system is fully booted and that important operating system components have been locked to prevent further altering. In one embodiment, some or all of the important operating system components are further locked so as to prevent reads.

In this embodiment, locking read access to the secure storage can be used to locked read access certain types of keys that the drive stores on the drive (e.g., keys that are loaded into memory (and presumably protected in memory as well) and the operating system does not want to let this key be readable from the drive anymore).

In one embodiment, the lockable storage is locked at the storage level such that any operating system command to override the unalterable status of these of sectors is ignored. In one embodiment, a write lock would maintain a table of protected regions within the firmware of the storage device (e.g., storage firmware 120 and/or trusted system firmware 118 of FIG. 1 above) and disallow any unauthorized attempts to write to those regions. In another embodiment, a write lock would be implemented by maintaining a table of protected regions within the firmware of the storage device, and disallow any unauthorized attempts to write to those regions.

At block 812, attempts to infect or otherwise alter these locked operating system files fail because the device firmware prevention modification prevents any alteration of these operating system files. In one embodiment, if a specified region of the drive is locked, the storage firmware can monitor incoming write commands for attempts to write to the "locked" LBA/LBAs and return a write error when such an attempt is made. In another embodiment, the storage firmware redirects the data in the write attempt to a special quarantine area for further analysis. In these embodiments, the normal operating system commands which would typically alter or replace these locked operating system files on the locked sectors will fail because the device firmware prevention modification overrides the storage access commands the operating system or other applications can use.

As described above, certain components of the operating system will be locked, so they can no longer be altered by normal operating system commands. While in many cases, this is a favorable situation because this disallows malware, viruses, etc. from infecting these operating system files. The problem is that there are times that these operating system files would need to be altered. In one embodiment, an operating system upgrade will likely need to alter the operating system files that are locked in a lockable storage.

Figure 9:
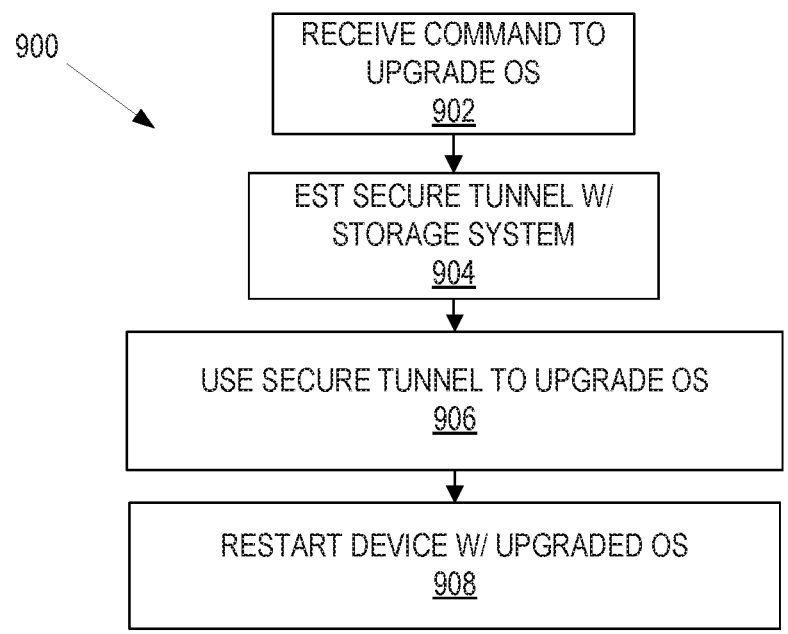
FIG. 9 illustrates an embodiment of a method for upgrading an operating system that has operating system data stored in locked storage.

FIG. 9 illustrates an embodiment of a method 900 for upgrading an operating system that has operating system data stored in locked storage. In one embodiment, an operating system upgrade will likely need to alter the operating system files that are locked in a lockable storage. In FIG. 9, method 900 is a method to upgrade an operating system by using an application programming interface (API) that has been authenticated with the storage system (e.g., the secure storage 114 via trusted API 146 as described in FIG. 1 above). By communication through the API, the locks on the storage remain in place and method 900 accesses data in the locked storage using a secure channel. This allows method 900 to make writes to the locked regions, where the writes a signed by an authenticated user of the API so that the firmware could verify that the changes came from the owner of the locked regions, not anyone else such as malware.

Method 900 begins by receiving the command to upgrade the operating system that includes locked files storing the some or all of the operating system components. In one embodiment, the command to upgrade the operating system is from a user initiated request or an automatic service provider request to upgrade the operating system as is known in the art. At block 904, method 900 establishes a secure tunnel with the storage system. In one embodiment, the secure tunnel is a secure tunnel between the secure storage system and an agent (such as an agent performing method 900) using the mailboxing scheme or the negotiated tunnel using SATA trusted sends and receives, as described above in FIGS. 1-6 above. At block 906, method 900 uses a secure tunnel to upgrade the operating system. In one embodiment, method 900 uses the secure tunnel to update the operating system components that need to be upgraded that are in the lockable storage. After these operating system components are updated, method 900 proceeds to upgrade the rest of the operating system as is known in the art. At block 908, method 900 restarts the device with the upgraded operating system.

Figure 10:
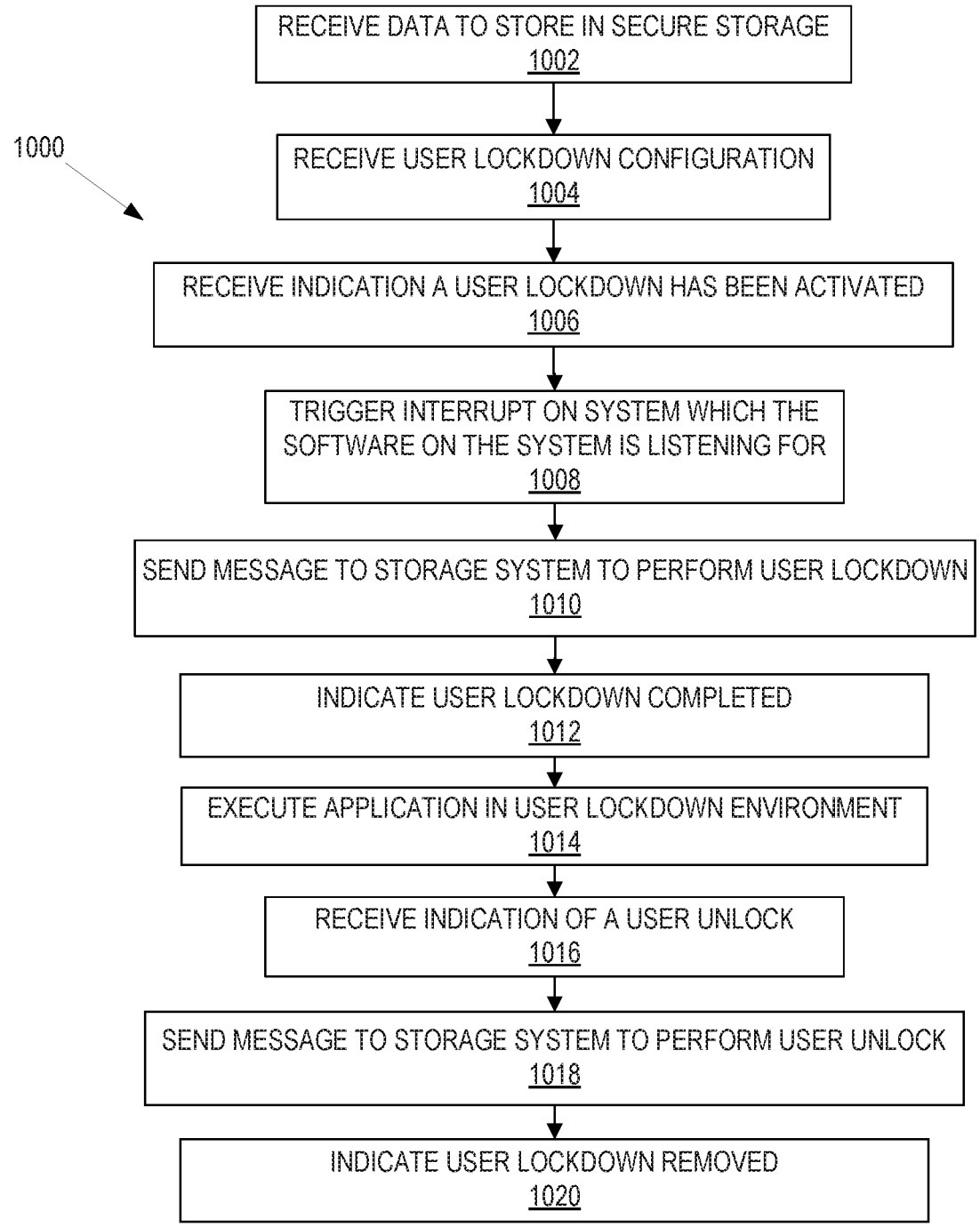
FIG. 10 illustrates an embodiment of a method for locking user storage.

As described above, there are two ways that a computer can lock data stored in the lockable storage. In one embodiment, the operating system locks data in the lockable storage during a boot sequence. In another embodiment, the user initiates a lockdown of the lockable storage to lock some or all of the user data. In one embodiment, either way to lock data can be used. In another embodiment, both ways to lock data in the lockable storage are available. FIG. 10 illustrates an embodiment of a method 1000 for locking user storage. In FIG. 10, method 1000 begins by receiving the data to be stored in the lockable storage. In one embodiment, the data to be stored in the lockable storage is important user data such as antivirus definition data, personal data, financial records, etc. At block 1004, method 1000 receives a user lockdown configuration. In one embodiment, this lockdown configuration specifies which data is to be locked in the lockable storage. While in one embodiment, the configuration is to lock all data in lockable storage, in another embodiment, the configuration can specify certain files and/or physical sectors of the lockable storage to be locked. In one embodiment, the lockdown configuration is defined by the user. In an alternate embodiment, a manufacturer of the computer device could use this mechanism to define which data is included in the lockable storage during a user lockdown request.

At block 1006, method 1000 receives an indication that a user lockdown has been activated. In one embodiment, a user may initiate a lockdown of lockable storage by activating a dedicated switch for the lockdown, a keyboard combo (e.g., ALT+F5, etc.), a touch sequence if using a touch user interface, or any other way to indicate a command to a computer as known in the art. At block 1008, method 1000 triggers system interrupt on the computer system, which the software on the system is listening for. In one embodiment, by triggering interrupt, method 1000 that executes a lockdown is outside of the operating system control. This is useful if malware, virus, etc., may be present on the computer system so that the malware cannot defeat the user initiated lockdown.

At block 1010, method 1000 sends a message to the storage system to perform the user lockdown. In one embodiment, method 1000 uses a tunnel between an agent executing method 1000 in the operating system to the secure storage system to perform the user lockdown. In one embodiment, method 1000 uses the tunnel as described above in FIGS. 1-6 above. At block 1012, method 1000 indicates that the user lockdown is completed. In one embodiment, method 1000 displays on this display of the computer system an icon or other graphical image that indicates that the user lockdown mode is initiated.

At block 1014, method 1000 executes an application in the user lockdown environment. In one embodiment, the user may initiate the lockdown, such that the user would like to execute a file or retrieve a file in an environment that may include malware, virus, or other potentially damaging software. By executing application during the user lockdown environment the data that is stored in the locked storage is prevented from being altered because the drive mechanism prevents an operating system process, (e.g., a malware, virus, etc.) from altering or deleting the data that is locked inside the lockable storage.

At block 1016, method 1000 receives an indication of the user unlock. In one embodiment, a user wants to unlock the lockable storage. At block 1018, method 1000 sends a message to the storage system to perform the user unlock. In one embodiment, method 1000 uses the tunnel between the agent that executes method 1000 and the secure storage system to perform the user unlock. At block 1020, method 1000 indicates a user lockdown has removed. In one embodiment, method 1000 removes the icon or image that is displayed on the user's display for indicating the user lockdown is in process.

Secure Download and Processing of Premium Content

Online media and streaming is a growing area and this increases the demand of having secure platforms to offer premium services to enhance end user experience and open new channels of distribution of content for content providers to help them increase their Total Available Market (TAM). Currently, personal computer (PC) platforms are not considered robust enough to allow content providers (e.g. Netflix™, movie and/or television studios, etc.) to permit download and/or stream of premium and most recent content onto a computing device (e.g., computer, set-top box, mobile device, etc., and/or any other type of device capable of receiving and/or presenting content). Content providers fear loss of intellectual property due to piracy and DRM violations. Due to these issues, content providers do not capture a sizeable chunk of customer segment that primarily uses PC platforms as their entertainment hub.

In addition, content providers and ISVs also want to make sure that their data is secure from point of origin till point of consumption, especially involving entertainment device segments offering an array of options for consumption of online and streaming content.

Described below is a system that allows content providers and ISVs to securely store and stream their content on PC and alternative platforms by enhancing the capabilities of storage platforms (e.g. premier content providers for latest movies, games, audio, books, etc.). The system would also offer to provision for secure execution by using the secure storage and tunnel capabilities of a storage platform to offer a trusted computing environment. In addition, the data path is secured from point of origin to the point of consumption through a secured tunnel, thereby minimizing the risk of snooping and DRM violation on exposed data in memory or platform.

Figure 11:
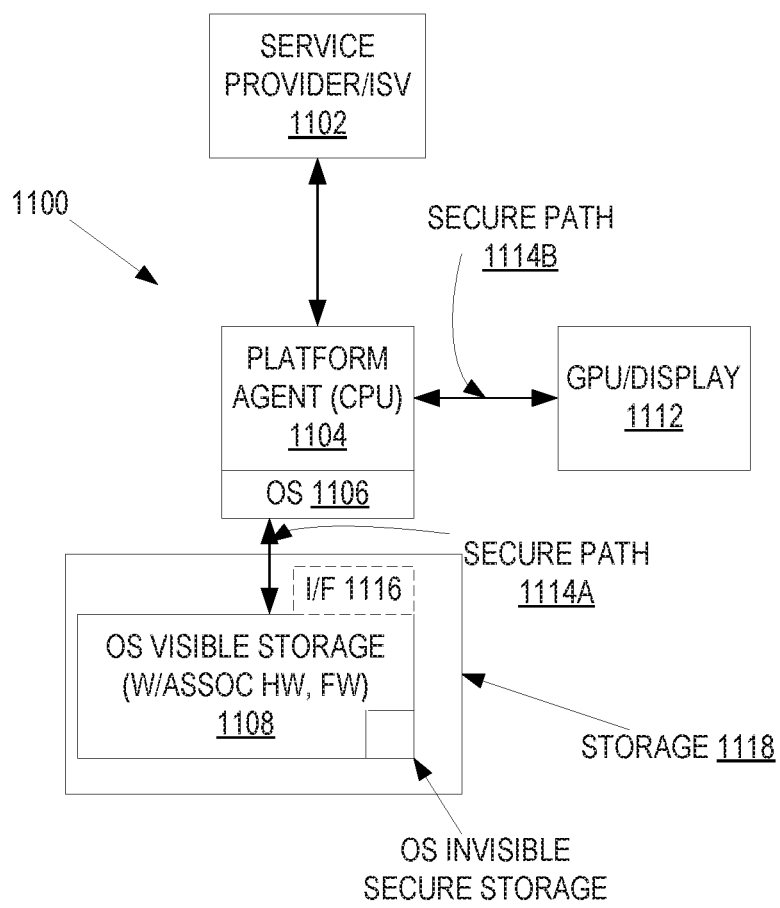
FIG. 11 illustrates an example of a system to secure digital rights managed content.

FIG. 11 illustrates an example of a system 1100 to secure digital rights managed content. In FIG. 11, system 1100 includes system provider/ISV 1102, platform agent 1104, storage 1118, and graphics processing unit (GPU)/display 1112. In one embodiment, the system provider/ISV 1102 is an entity that provides content that is protected by digital rights management (DRM). Examples of DRM protected content can be video, audio, images, book, game, software, etc. and/or any type of content whose use is meant to be restricted by the system provider/ISV 1102. In one embodiment, the system provider/ISV 1102 includes a server that is used to download the DRM protected content to the platform agent 1104.

In one embodiment, the platform agent 1104 includes an operating system 1106, where the platform agent is a computer and/or device as described above in FIG. 1 above. In one embodiment, the platform agent 1104 establishes a root of trust with the system provider/ISV 1102, so that the system provider/ISV 1102 can securely download the DRM protected content to the platform agents 1104. Furthermore, the platform agent is coupled to storage 1118. In one embodiment, the storage includes operating system visible storage 1108, where the operating system visible storage 1108 includes associated hardware and firmware. For example and in one embodiment, operating system visible storage 1108 is the normal storage 116 as described in FIG. 1 above. Furthermore, storage 1118 includes operating system invisible secure storage 1110 that, in one embodiment, is used to securely store the DRM protected content. For example and in one embodiment, operating system invisible storage 1110 is secure storage 114.

In one embodiment, the platform agent 1104 stores the DRM protected content to the operating system invisible secure storage 1110 using secure path 1114A. In one embodiment, the secure path 1114A is a tunnel that is formed between the platform agent 1104 and the operating system invisible secure storage 1110. An example of the tunnel is described in FIGS. 1-6 above. The platform agent is further coupled to the GPU/display 1112 via a secure path 1114B. In one embodiment, the secure path 1114B is a tunnel between the platform agent 1104 and GPU/display 1112.

Figure 12:
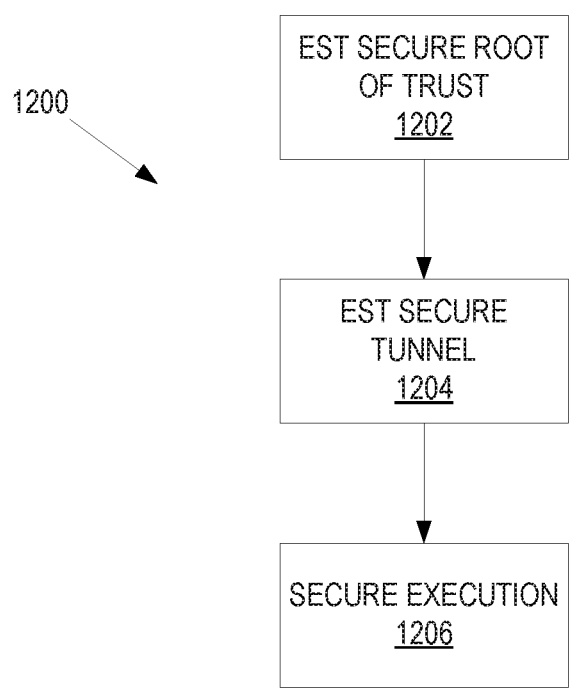
FIG. 12 illustrates an embodiment of a method for securely storing digital rights managed content.

FIG. 12 illustrates an embodiment of a method 1200 for securely storing and processing digital rights managed content. In one embodiment, a platform agent 1104 executes method 1200 to securely store and process the DRM content. In FIG. 12, method 1200 begins by establishing a secure root of trust with a system provider/ISV at block 1202, such as system provider/ISV 1104 as described in FIG. 11 above. In one embodiment, the system provider/ISV authenticates the platform agent as a trusted agent using a third party provisioning service. For example and in one embodiment, the system provider/ISV classifies the platform agent as a trusted agent using a key or certificate issued by a third party, such as a third party provision service. By classifying the platform agent as the trusted agent, method 1200 establishes a secure root of trust with the system provider/ISV and further establishes a secure path to download the DRM protected content that can be used to store in the secure storage.

At block 1204, method 1200 establishes a secure tunnel with the secure storage. In one embodiment, the secure storage is the operating system invisible storage 1110. In one embodiment, method establishes a secure tunnel with the storage as described in FIGS. 1-6 above. In this embodiment, the secure tunnel between the secure storage and the platform agent allows platform to securely download DRM protected content to the secure storage. Furthermore, method 1200 establishes a tunnel between the operating system invisible storage and the GPU/display. In one embodiment, the second tunnel is established with operating system invisible storage and the GPU/display using a key exchange mechanism.

Using the two tunnels, method 1200 securely executes the downloading and processing of the DRM protected content. In one embodiment, method 1200 securely downloads the DRM protected content from the system provider/ISV to the operating system invisible storage. Method 1200 further decrypts and re-encrypts the DRM protected content so that the GPU/display can process this content. Securely executing the downloading and processing of the DRM content is further described in FIG. 13 below.

Figure 13:
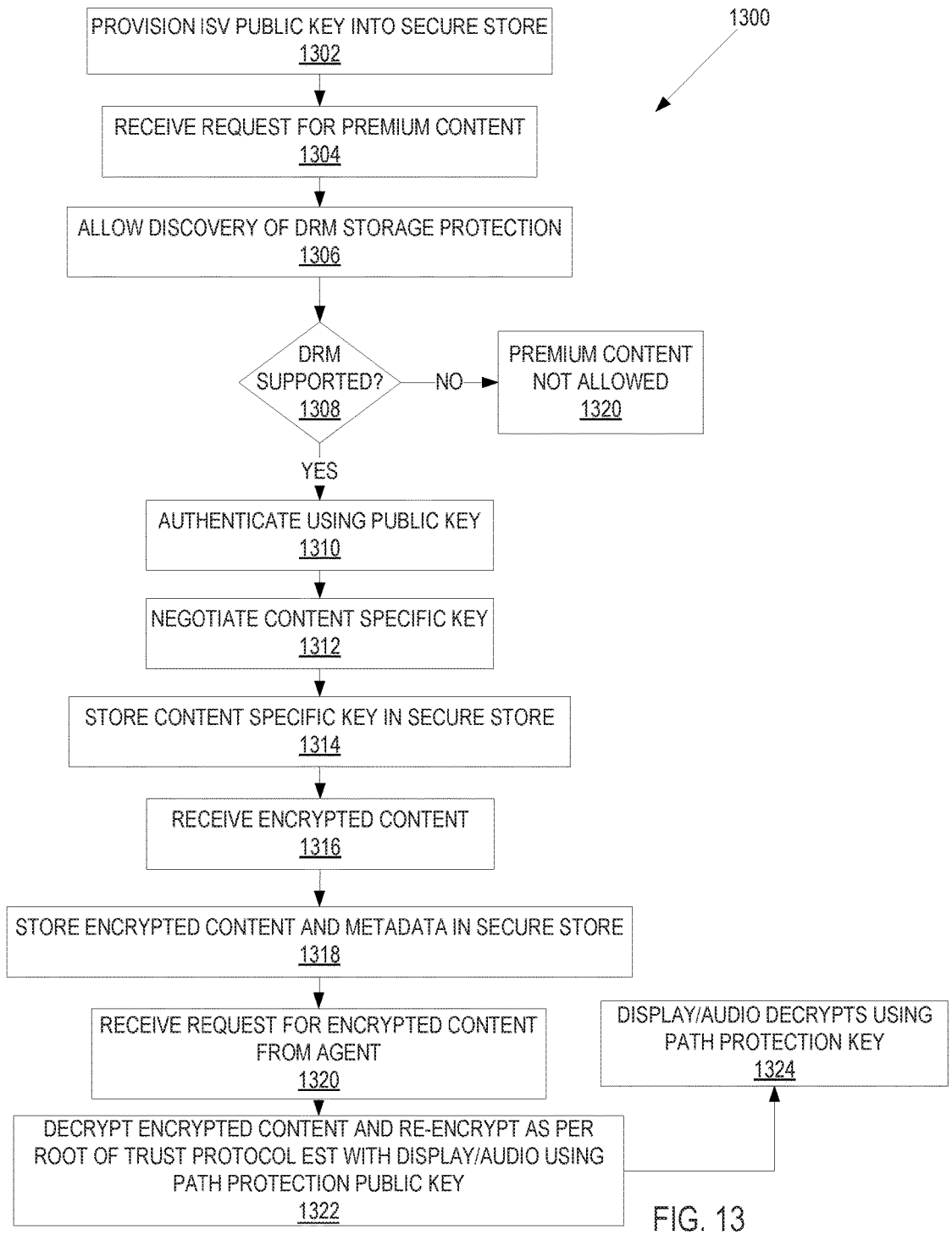
FIG. 13 illustrates an embodiment of a method for requesting, storing, and providing digital rights managed content.

FIG. 13 illustrates an embodiment of a method 1300 for requesting, storing, and providing DRM content. In FIG. 13, method 1300 begins by provisioning the ISV key into the secure storage at block 1302. In one embodiment, method 1300 provisions the ISV public key by receiving a client certificate from a remote server of a certificate provisioning service. Provisioning the public key is further described in FIG. 14 below. At block 1304, method 1300 receives a request for premium content. In one embodiment, premium content is content that is managed using a digital rights management scheme. For example and in one embodiment, the premium content could be a video, audio, images, book, document, game, software, etc. or any other type of media that can be protected by digital rights management. For example and in one embodiment, method 1300 can be used to tie premium content to a single device, such as the device that accesses this premium content.

Method 1300 allows discovery of the DRM storage protection at block 1306. In one embodiment, the DRM storage protection is the secure storage system, as described above in FIG. 1. The DRM storage protection allows a content provider to securely store, stream, and/or otherwise process the premium content without a fear of the content being copied, viewed and/or made available without permission. At block 1308, method 1300 determines if the DRM storage protection is supported. If the DRM storage protection is not supported, at block 1320, the premium content is not allowed to be stored on the device that is executing method 1300. If the DRM storage protection is supported at block 1308, at block 1310, method 1300 authenticates using the public key. In one embodiment, the public key is a key that allows the premium content to be downloaded from the premium content provider or ISV (e.g., service provider/ISV 1202 as described above in FIG. 12). In one embodiment, the public key is provisioned at block 1302 above. At block 1312, method 1300 negotiates a content specific key with the premium content service provider/ISV. In one embodiment, negotiating the content specific key generates a key that is specific to the requested premium content.

At block 1314, method 1300 stores the content specific key in the secure storage. In one embodiment, method 1300 uses a tunnel to the secure storage system to store the specific content key. At block 1316, method 1300 receives an encrypted content that corresponds to the request of the premium content. As described above, the encrypted content could be video, audio, images, book, game, software, etc., or any other type of DRM protected content. Furthermore, the retrieved content is encrypted and can be decrypted using the content specific key retrieved at block 1312. At block 1318, method 1300 stores encrypted content and associated content metadata in the secure storage. In one embodiment, method 1300 uses the tunnel between the agent that is executing method 1300 and the secure storage to securely store the encrypted content and associated metadata. In one embodiment, the metadata is data that describes the encrypted content (e.g., title, artist, author, genre, length, size, encoding, etc. and/or other parameters associated with premium content as known in the art).

A block 1320, method 1300 receives a request for encrypted content from the agent. In one embodiment, the agent is a software entity that is party to secure transactions between content providers and secure storage system. In one embodiment, the agent is further described above in FIG. 12. At block 1322, method 1300 decrypts the encrypted content and re-encrypts this content as per the root of trust protocol established with the display/audio using a path protection public key. By re-encrypting the content with the root of trust protocol, the downloaded premium content can be viewed using the using the pass protection public key with the display/audio. At block 1324, method 1300 decrypts the re-encrypted content using the pass protection key.

Figure 14:
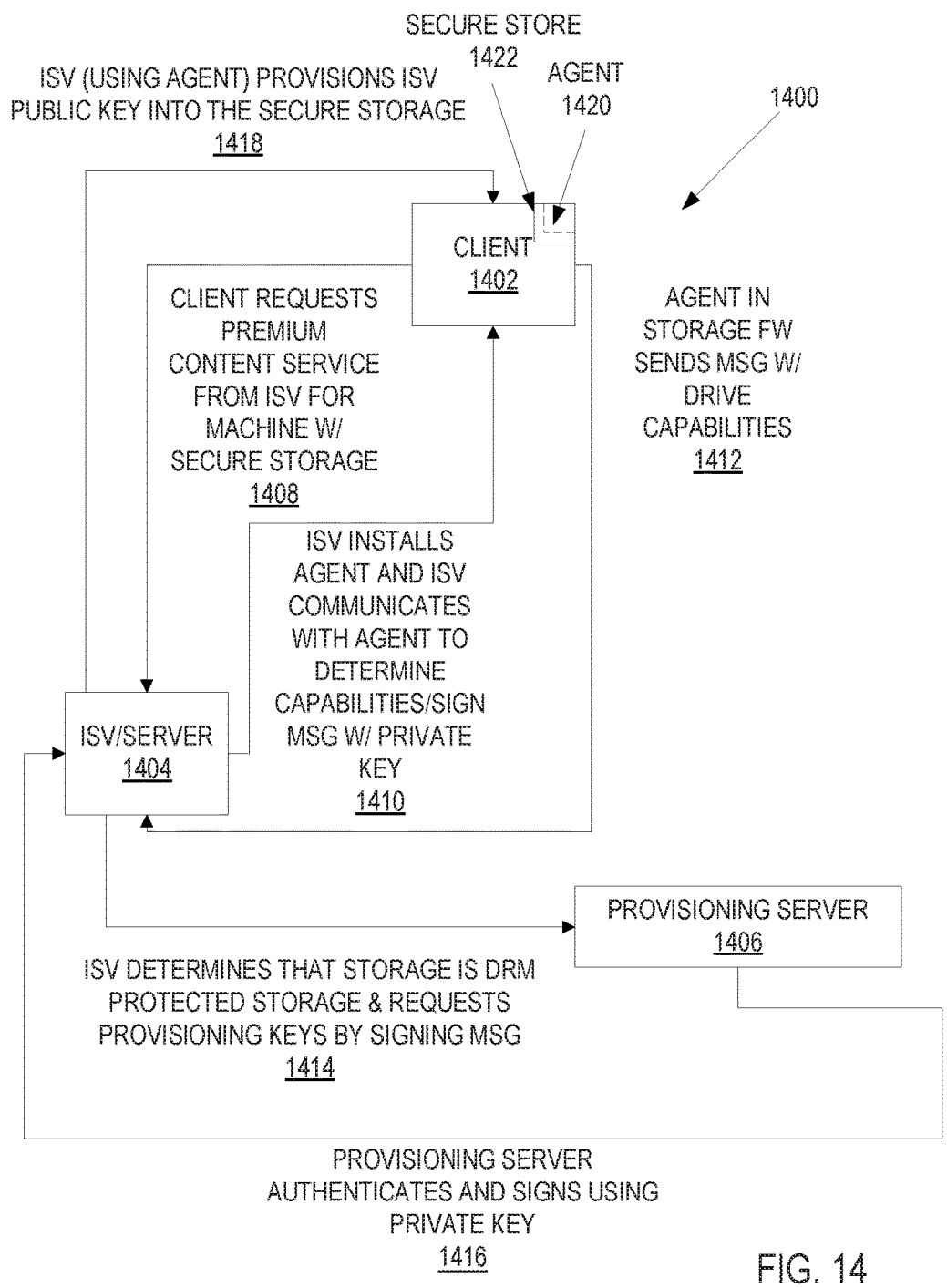
FIG. 14 illustrates an example of a system that includes a client that requests and is granted a root of trust.

As described above, in order for a client to receive premium content, the client will need a root of trust. FIG. 14 illustrates an example of a system 1400 that includes a client that requests and is granted a root of trust. In FIG. 14, client 1402 is a client that can request the premium content from ISV/server 1404, where the ISV/server 1404 requests a provisioning key from a provisioning server 1406 for the client 1402. The system 1400 is used to securely download and display, execute, etc., the premium content by agent 1420.

In FIG. 14, the client requests the premium content (1408) from the ISV/server 1404. In one embodiment, the client 1402 includes secure storage 1422. In response to receiving the client request for premium content, the ISV/server 1404 installs the agent 1420 on the client 1402 in the secure storage and communicates with the agent 1420 to determine capabilities of the client 1402 (1410). In addition, the ISV/server 1404 signs this message with a private key The agent 1420 in the secure storage sends a message with drive capabilities back to the ISV/server 1404 (1412). In response, the ISV/server 1404 determines if the storage is DRM protected storage at 1414. If the storage is DRM protected storage, the ISV/server 1404 requests the provisioning key by signing the message and sending the signed message to the provisioning server 1406. In one embodiment of provisioning server 1406 provides the provisioning key. In addition, the provisioning server 1406 signs the provisioning key using the private key of the provisioning server 1406. The provisioning server 1406 may be a third party provisioning server or may belong to part of the ISV. The provisioning server 1406 sends the provisioning keys to the ISV/server 1404.

In response to receiving the provisioning keys, the ISV/server 1404 provisions the ISV public key with the provisioning key at 1418. In one embodiment, the ISV public key is unique to the client. In one embodiment, the ISV public key is unique to the ISV/server 1404 for that client. In one embodiment, the ISV/server 1406 authenticates the client 1402 and stores the public key using the agent 1420 of the secure storage 1422. In one embodiment, the ISV public key is stored in the secure storage 1422 of the client 1402. At the end of this sequence, the ISV/server store 1404 has provisioned public key into the secure storage 1422 of the client 1402 and the rest of the steps as indicated in method 1300 may be performed to download and process the premium content.

Activation and Monetization of Value-Added Storage Services

Hard drive companies are struggling to monetize features and capabilities built into their hardware. In their effort to minimize and contain their number of different models, storage companies may end up selling hardware for a lowest common denominator price, which in turn negatively impacts the storage companies' profitability. This is because storage companies cannot securely activate and/or revoke value-added storage services of devices in the field not to generate secondary revenue sources. In one embodiment, revocation transfers management rights of physical resources (e.g., storage devices) from one service provider to another. For example and in one embodiment, vendor A would revoke management services for a given device, while vendor B would activate new services for the same device. Potential value-added storage services can include additional storage enablement, anti-theft technology, secure storage, storage device encryption, etc.

Figure 15:
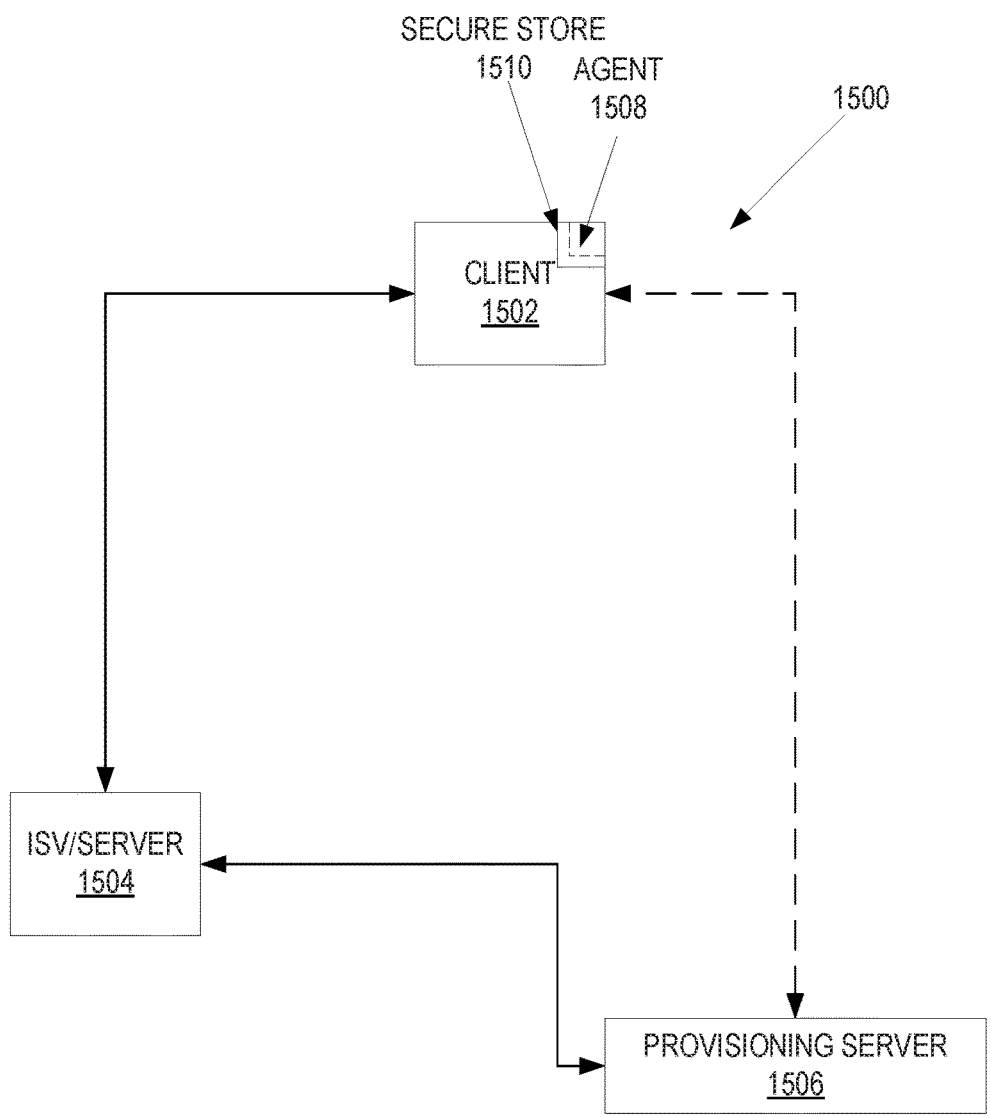
FIG. 15 illustrates an example of a system that includes a client that requests and is granted activation of value-added storage features.

FIG. 15 illustrates an example of a system 1500 that includes a client 1502 that requests and is granted activation of value-added storage services. In FIG. 15, the system 1500 includes a client 1502 that requests the activation (and/or revocation) of value-added storage feature to ISV/server 1504. In response to receiving the client 1502 request, the ISV/server 1504 sends a request to the provisioning server 1504 to determine if the client 1502 is authorized for that request. In one embodiment, possible value-added storage services may include enablement of extra storage for the client, allowing DRM premium content stored on the client 1502, anti-theft technology, secure storage, etc. In one embodiment, the provisioning server 1506 determines if the client 1502 is authorized to activate the requested value-added storage feature. If so, the provisioning server 1506 sends the authorization to the ISV/server 1504. The ISV/server 1504 installs an agent 1508 on the client 1502 that is used to make a request for a license for a possible value-added storage services. By provisioning the public key and agent to the client, a secure root of trust is created for the client.

Figure 16:
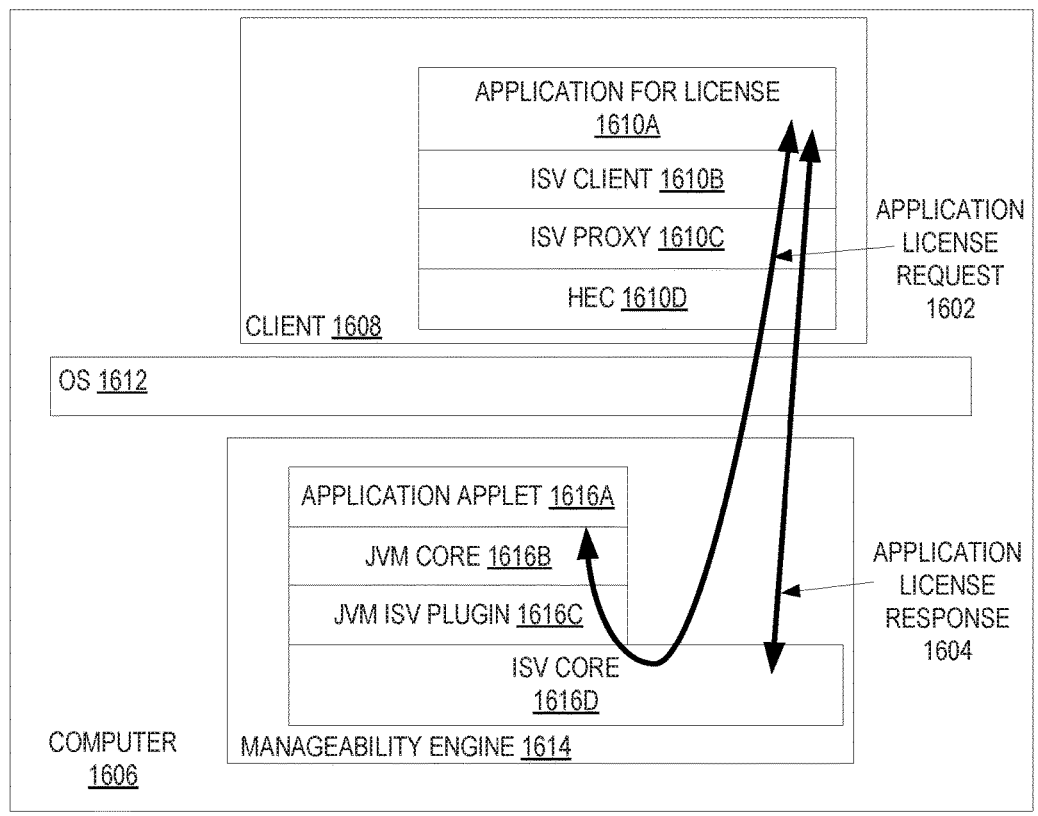
FIG. 16 illustrates an example of an application that requests a license for a value-added storage feature via a manageability engine.

Once the secure root of trust is established, an application running on the client 1502 may request a license for a value-added storage service using the agent 1508. In this embodiment, the agent 1508 sends a request to the ISV/server 1504 in response receiving a request for a value-added storage services license from that application. In one embodiment, the ISV/server 1504 forwards this request to the provisioning server 1506. The provisioning server 1506 authorizes the license request and sends this authorization back to the ISV/server 1504. The ISV/server 1504 receives the authorization from the provisioning server 1506 and issues a license for the requested value-added storage feature to the client 1502. How the agent 1508 works in association with the client is further described in FIG. 16 below FIG. 16 illustrates an example of an application that requests a license for a value-added storage feature via a manageability engine 1614. In FIG. 16, computer 1606 includes client 1608, OS 1612, and manageability engines 1614. In one embodiment, the manageability engine 1614 is the agent as described above in FIG. 15. In one embodiment, the client 1608 requests includes an application 1610A that makes a request of license for a value-added storage service. In this embodiment, client 1608 includes the application for license 1610A, the ISV client 1610B, the ISV proxy 1610C, and Host Embedded Controller Interface (HEC) 1610D. These components of the client 1608 are used to make the application license request 1602 to the manageability engine 1614. In one embodiment, OS 1612 is an operating system is known in the art and is further described in FIG. 1 above.

In one embodiment, manageability engine 1614 includes application applet 1616A, JVM core 1616B, JVM ISV plugin 1616C, and ISV core 1616D. In one embodiment, the client 1606 makes a request for a value-added storage service license to the application applet 1616A via the ISV core 1616D, ISV plugin 1616C, and JVM core 1616B. In one embodiment, the client 1610 uses the components 1610A-D to communicate with the manageability engine 1614 and to make a license request with the ISV/server. In one embodiment, the application applet 1616A is an application to control the license request process to the ISV/server. In one embodiment, JVM core 1616B is a Java virtual machine core as known in the art and is used to execute the application applet 1616A. In one embodiment, the JVM ISP plugin 1616C is a plug-in that runs in the manageability engines 1614 and is used to communicate data between the ISP core 1616B and the JVM core 1616D.

The ISV core 1616D, in one embodiment, is a module that communicates directly with the remote ISV/server such as remote ISV/server 1506 as described above in FIG. 15 above. In one embodiment, the ISV core 1616D includes a TCP/IP network stack that allows the ISV core 1616D to directly communicate via the Internet or some other networking protocol to request and receive the licenses that the application for license 1610A is requesting. In one embodiment, the management engine 1614 is part of the secure storage of the computer 1606. In this embodiment, the manageability engine 1514 is a process that runs outside of OS 1612 and is used to securely communicate and download the license for the storage feature. Requesting the license is further described in FIG. 17 below.

Figure 17:
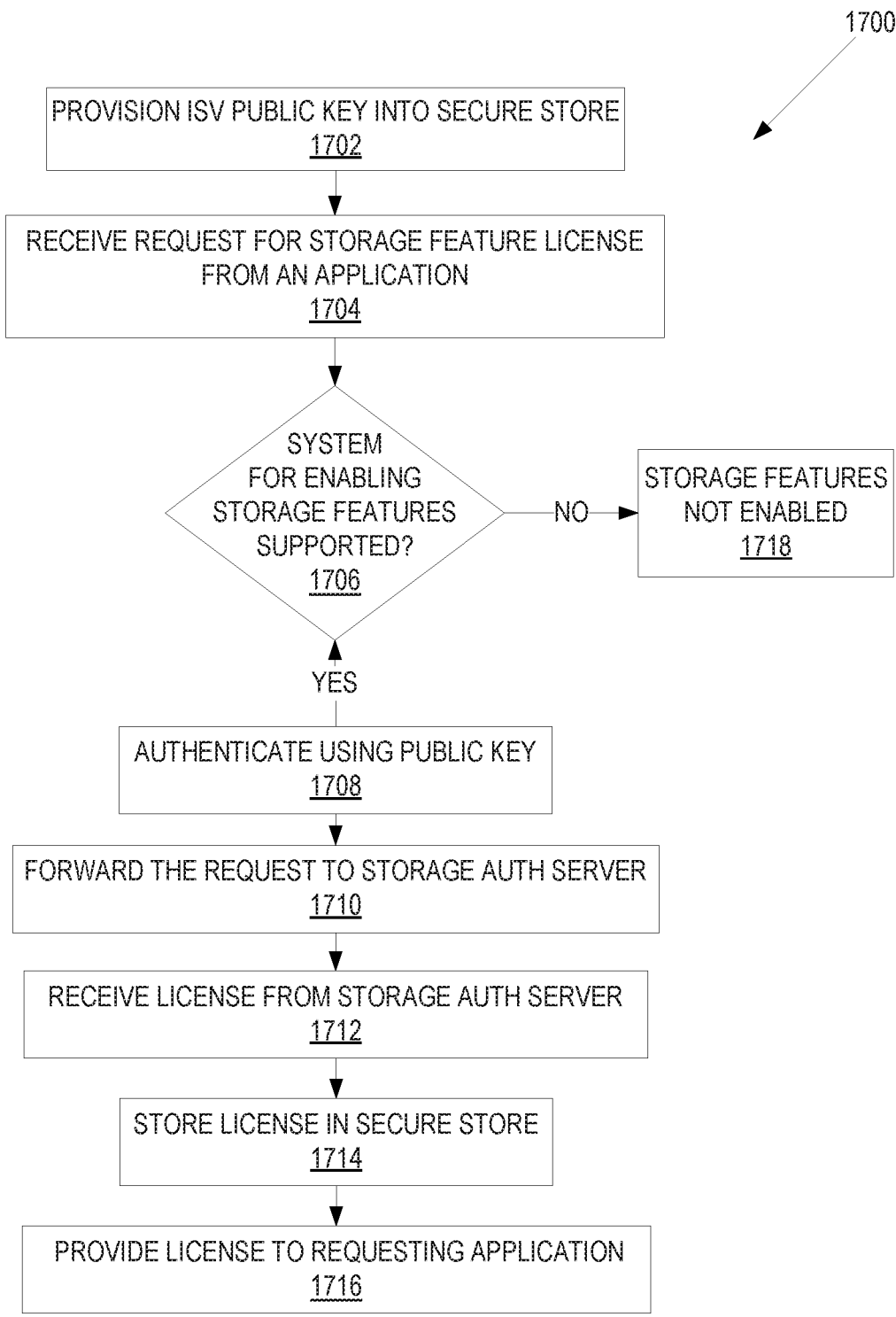
FIG. 17 illustrates an embodiment of a method for requesting a license for a value-added storage feature.

FIG. 17 illustrates an embodiment of a method for requesting a license for a value-added storage feature. In FIG. 17, method 1700 begins provisioning the ISV public key to the secure storage of the client. In one embodiment, provisioning of the ISV public key into the secure storage is further described in FIG. 14 above. At block 1704, method 1700 receives a request for value-added storage feature license from an application. In one embodiment, the value added storage service can be video, audio, images, book, game, software, etc. At block 1706, method 1700 determines if the system for enabling storage services is supported. For example and in one embodiment, if method 1700 determines that a client has a secure storage to store the requested licenses, the client then has a system for enabling storage services.

If the system for enabling storage features is not supported, at block 1718, method 1700 determines that storage features are not enabled. No further action is taken. If the system for enabling storage features is supported, at block 1708, method 1700 authenticates using the public key. In one embodiment, method 1700 authenticates using the public key that was stored in the secure storage at block 1702 above. A block 1710, method 1704 receives and forwards a request for a value-added storage service to the storage authorization server. In one embodiment, the storage authorization server is the ISV/server 1504 as illustrated in FIG. 15 above. In this embodiment, the secure storage enables requests for value-added storage feature license and handles the requests.

In a block 1712, method 1700 receives a license from the storage authorization server. Method 1700 stores the requested license in the secure storage at block 1714. In one embodiment, method 1700 uses a tunnel such as a tunnel as described in FIGS. 1-6 above to store the license in the secure storage. At block 1716, method 1700 provides a license to the requesting application. In one embodiment, method 1700 provides license as described above in FIG. 16 above.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 18A is a block diagram illustrating both an exemplary in-order pipeline and an exemplary register renaming, out-of-order issue/execution pipeline according to embodiments of the invention. FIG. 18B is a block diagram illustrating both an exemplary embodiment of an in-order architecture core and an exemplary register renaming, out-of-order issue/execution architecture core to be included in a processor according to embodiments of the invention. The solid lined boxes in FIGS. 18A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 18A, a processor pipeline 1800 includes a fetch stage 1802, a length decode stage 1804, a decode stage 1806, an allocation stage 1808, a renaming stage 1810, a scheduling (also known as a dispatch or issue) stage 1812, a register read/memory read stage 1814, an execute stage 1816, a write back/memory write stage 1818, an exception handling stage 1822, and a commit stage 1824.

FIG. 18B shows processor core 1890 including a front end unit 1830 coupled to an execution engine unit 1850, and both are coupled to a memory unit 1870. The core 1890 may be a reduced instruction set computing (RISC) core, a complex instruction set computing (CISC) core, a very long instruction word (VLIW) core, or a hybrid or alternative core type. As yet another option, the core 1890 may be a special-purpose core, such as, for example, a network or communication core, compression engine, coprocessor core, general purpose computing graphics processing unit (GPGPU) core, graphics core, or the like.

The front end unit 1830 includes a branch prediction unit 1832 coupled to an instruction cache unit 1834, which is coupled to an instruction translation lookaside buffer (TLB) 1836, which is coupled to an instruction fetch unit 1838, which is coupled to a decode unit 1840. The decode unit 1840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1890 includes a microcode ROM or other medium that stores microcode for certain macroinstructions (e.g., in decode unit 1840 or otherwise within the front end unit 1830). The decode unit 1840 is coupled to a rename/allocator unit 1852 in the execution engine unit 1850.

The execution engine unit 1850 includes the rename/allocator unit 1852 coupled to a retirement unit 1854 and a set of one or more scheduler unit(s) 1856. The scheduler unit(s) 1856 represents any number of different schedulers, including reservations stations, central instruction window, etc. The scheduler unit(s) 1856 is coupled to the physical register file(s) unit(s) 1858. Each of the physical register file(s) units 1858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1858 comprises a vector registers unit, a write mask registers unit, and a scalar registers unit. These register units may provide architectural vector registers, vector mask registers, and general purpose registers. The physical register file(s) unit(s) 1858 is overlapped by the retirement unit 1854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1854 and the physical register file(s) unit(s) 1858 are coupled to the execution cluster(s) 1860. The execution cluster(s) 1860 includes a set of one or more execution units 1862 and a set of one or more memory access units 1864. The execution units 1862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1856, physical register file(s) unit(s) 1858, and execution cluster(s) 1860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1864). It should also be understood that where separate pipelines are used, one or more of these pipelines may be out-of-order issue/execution and the rest in-order.

The set of memory access units 1864 is coupled to the memory unit 1870, which includes a data TLB unit 1872 coupled to a data cache unit 1874 coupled to a level 2 (L2) cache unit 1876. In one exemplary embodiment, the memory access units 1864 may include a load unit, a store address unit, and a store data unit, each of which is coupled to the data TLB unit 1872 in the memory unit 1870. The instruction cache unit 1834 is further coupled to a level 2 (L2) cache unit 1876 in the memory unit 1870. The L2 cache unit 1876 is coupled to one or more other levels of cache and eventually to a main memory.

By way of example, the exemplary register renaming, out-of-order issue/execution core architecture may implement the pipeline 1800 as follows: 1) the instruction fetch 1838 performs the fetch and length decoding stages 1802 and 1804; 2) the decode unit 1840 performs the decode stage 1806; 3) the rename/allocator unit 1852 performs the allocation stage 1808 and renaming stage 1810; 4) the scheduler unit(s) 1856 performs the schedule stage 1812; 5) the physical register file(s) unit(s) 1858 and the memory unit 1870 perform the register read/memory read stage 1814; the execution cluster 1860 perform the execute stage 1816; 6) the memory unit 1870 and the physical register file(s) unit(s) 1858 perform the write back/memory write stage 1818; 7) various units may be involved in the exception handling stage 1822; and 8) the retirement unit 1854 and the physical register file(s) unit(s) 1858 perform the commit stage 1824.

The core 1890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1834/1874 and a shared L2 cache unit 1876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 19A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 19A is a block diagram of a single processor core, along with its connection to the on-die interconnect network 1902 and with its local subset of the Level 2 (L2) cache 1904, according to embodiments of the invention. In one embodiment, an instruction decoder 1900 supports the x86 instruction set with a packed data instruction set extension. An L1 cache 1906 allows low-latency accesses to cache memory into the scalar and vector units. While in one embodiment (to simplify the design), a scalar unit 1908 and a vector unit 1910 use separate register sets (respectively, scalar registers 1912 and vector registers 1914) and data transferred between them is written to memory and then read back in from a level 1 (L1) cache 1906, alternative embodiments of the invention may use a different approach (e.g., use a single register set or include a communication path that allow data to be transferred between the two register files without being written and read back).

The local subset of the L2 cache 1904 is part of a global L2 cache that is divided into separate local subsets, one per processor core. Each processor core has a direct access path to its own local subset of the L2 cache 1904. Data read by a processor core is stored in its L2 cache subset 1904 and can be accessed quickly, in parallel with other processor cores accessing their own local L2 cache subsets. Data written by a processor core is stored in its own L2 cache subset 1904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 19B is an expanded view of part of the processor core in FIG. 19A according to embodiments of the invention. FIG. 19B includes an L1 data cache 1906A part of the L1 cache 1904, as well as more detail regarding the vector unit 1910 and the vector registers 1914. Specifically, the vector unit 1910 is a 16-wide vector processing unit (VPU) (see the 16-wide ALU 1928), which executes one or more of integer, single-precision float, and double-precision float instructions. The VPU supports swizzling the register inputs with swizzle unit 1920, numeric conversion with numeric convert units 1922A-B, and replication with replication unit 1924 on the memory input. Write mask registers 1926 allow predicating resulting vector writes.

Processor with Integrated Memory Controller and Graphics

Figure 20:
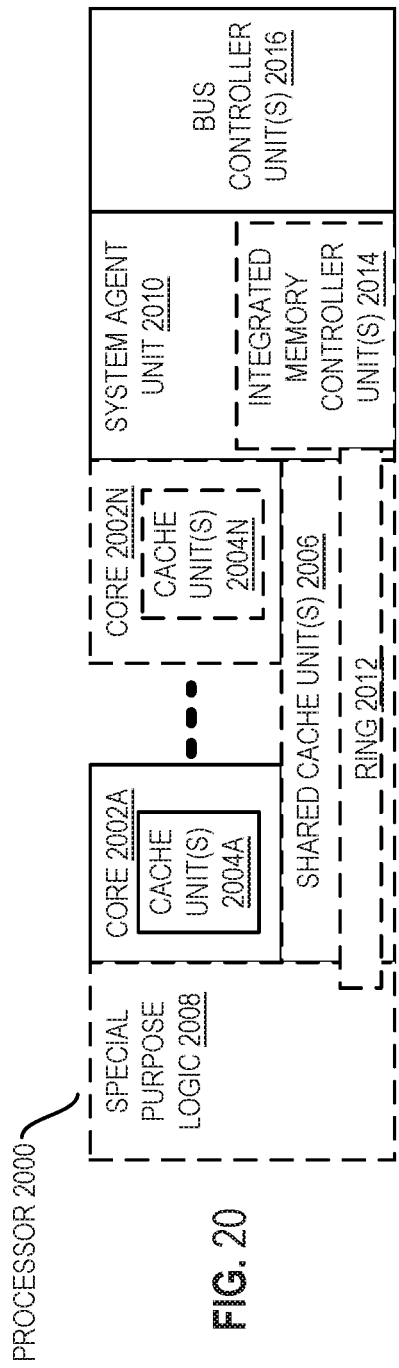
FIG. 20 is a block diagram illustrating a processor that may have more than one core according to embodiments of the invention.

FIG. 20 is a block diagram of a processor 2000 that may have more than one core, may have an integrated memory controller, and may have integrated graphics according to embodiments of the invention. The solid lined boxes in FIG. 20 illustrate a processor 2000 with a single core 2002A, a system agent 2010, a set of one or more bus controller units 2016, while the optional addition of the dashed lined boxes illustrates an alternative processor 2000 with multiple cores 2002A-N, a set of one or more integrated memory controller unit(s) 2014 in the system agent unit 2010, and special purpose logic 2008.

Thus, different implementations of the processor 2000 may include: 1) a CPU with the special purpose logic 2008 being integrated graphics and/or scientific (throughput) logic (which may include one or more cores), and the cores 2002A-N being one or more general purpose cores (e.g., general purpose in-order cores, general purpose out-of-order cores, a combination of the two); 2) a coprocessor with the cores 2002A-N being a large number of special purpose cores intended primarily for graphics and/or scientific (throughput); and 3) a coprocessor with the cores 2002A-N being a large number of general purpose in-order cores. Thus, the processor 2000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 2006, and external memory (not shown) coupled to the set of integrated memory controller units 2014. The set of shared cache units 2006 may include one or more mid-level caches, such as level 2 (L2), level 3 (L3), level 4 (L4), or other levels of cache, a last level cache (LLC), and/or combinations thereof. While in one embodiment a ring based interconnect unit 2012 interconnects the integrated graphics logic 2008, the set of shared cache units 2006, and the system agent unit 2010/integrated memory controller unit(s) 2014, alternative embodiments may use any number of well-known techniques for interconnecting such units. In one embodiment, coherency is maintained between one or more cache units 2006 and cores 2002-A-N.

In some embodiments, one or more of the cores 2002A-N are capable of multi-threading. The system agent 2010 includes those components coordinating and operating cores 2002A-N. The system agent unit 2010 may include for example a power control unit (PCU) and a display unit. The PCU may be or include logic and components needed for regulating the power state of the cores 2002A-N and the integrated graphics logic 2008. The display unit is for driving one or more externally connected displays.

The cores 2002A-N may be homogenous or heterogeneous in terms of architecture instruction set; that is, two or more of the cores 2002A-N may be capable of execution the same instruction set, while others may be capable of executing only a subset of that instruction set or a different instruction set.

Exemplary Computer Architectures

FIGS. 21-24 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 21:
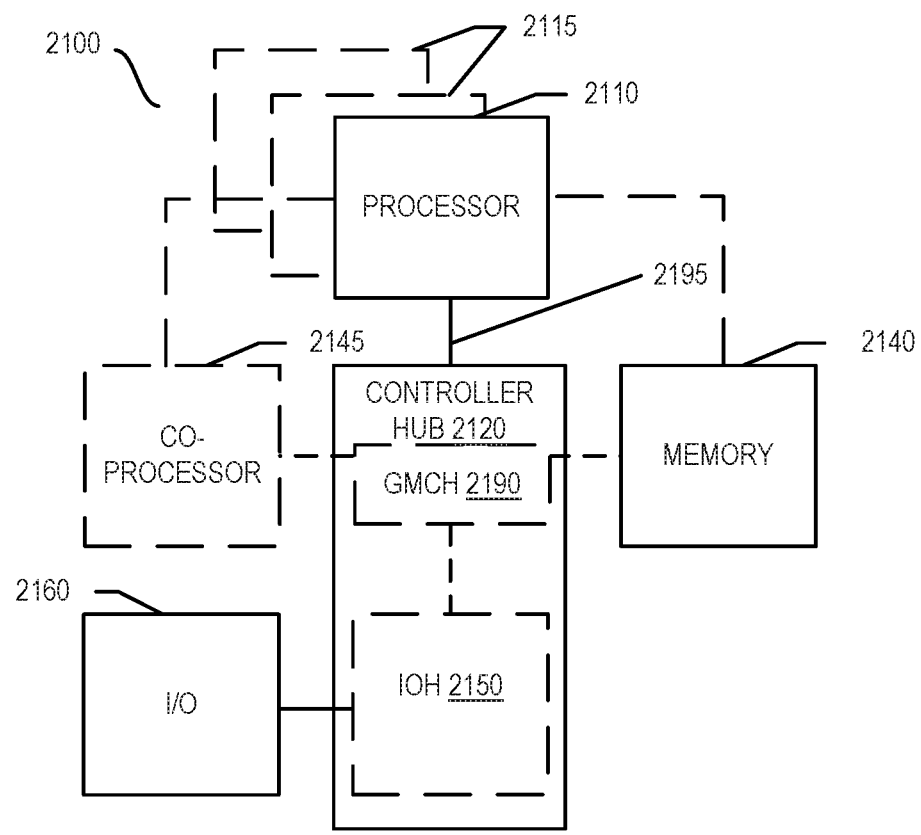
FIG. 21 is a block diagram of a system in accordance with one embodiment of the invention.

Referring now to FIG. 21, shown is a block diagram of a system 2100 in accordance with one embodiment of the present invention. The system 2100 may include one or more processors 2110, 2115, which are coupled to a controller hub 2120. In one embodiment the controller hub 2120 includes a graphics memory controller hub (GMCH) 2190 and an Input/Output Hub (IOH) 2150 (which may be on separate chips); the GMCH 2190 includes memory and graphics controllers to which are coupled memory 2140 and a coprocessor 2145; the IOH 2150 is couples input/output (I/O) devices 2160 to the GMCH 2190. Alternatively, one or both of the memory and graphics controllers are integrated within the processor (as described herein), the memory 2140 and the coprocessor 2145 are coupled directly to the processor 2110, and the controller hub 2120 in a single chip with the IOH 2150.

The optional nature of additional processors 2115 is denoted in FIG. 21 with broken lines. Each processor 2110, 2115 may include one or more of the processing cores described herein and may be some version of the processor 2000.

The memory 2140 may be, for example, dynamic random access memory (DRAM), phase change memory (PCM), or a combination of the two. For at least one embodiment, the controller hub 2120 communicates with the processor(s) 2110, 2115 via a multi-drop bus, such as a frontside bus (FSB), point-to-point interface such as QuickPath Interconnect (QPI), or similar connection 2195.

In one embodiment, the coprocessor 2145 is a special-purpose processor, such as, for example, a high-throughput MIC processor, a network or communication processor, compression engine, graphics processor, GPGPU, embedded processor, or the like. In one embodiment, controller hub 2120 may include an integrated graphics accelerator.

There can be a variety of differences between the physical resources 2110, 2115 in terms of a spectrum of metrics of merit including architectural, microarchitectural, thermal, power consumption characteristics, and the like.

In one embodiment, the processor 2110 executes instructions that control data processing operations of a general type. Embedded within the instructions may be coprocessor instructions. The processor 2110 recognizes these coprocessor instructions as being of a type that should be executed by the attached coprocessor 2145. Accordingly, the processor 2110 issues these coprocessor instructions (or control signals representing coprocessor instructions) on a coprocessor bus or other interconnect, to coprocessor 2145. Coprocessor(s) 2145 accept and execute the received coprocessor instructions.

Figure 22:
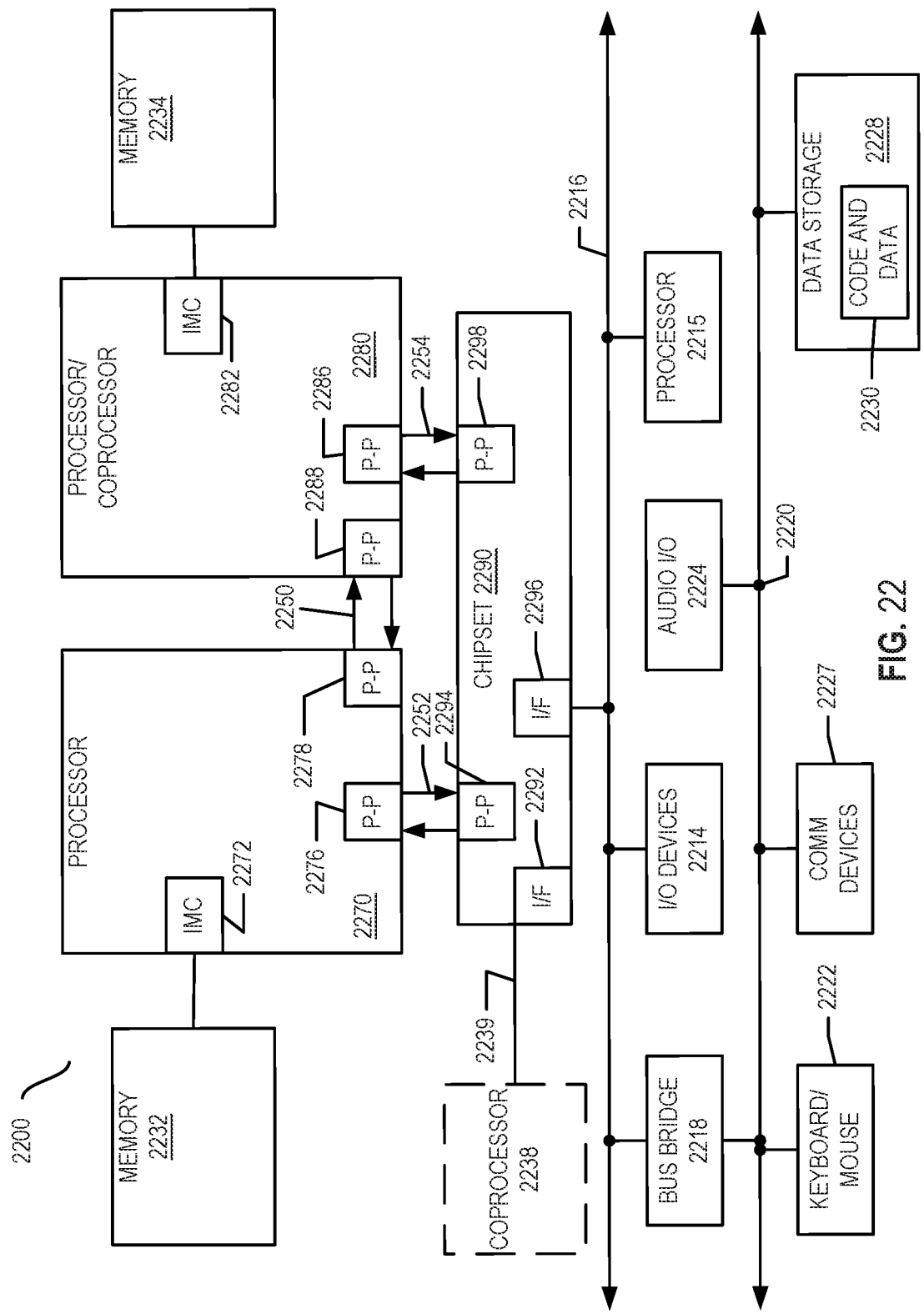
FIG. 22 is a block diagram of a second system in accordance with an embodiment of the invention.

Referring now to FIG. 22, shown is a block diagram of a first more specific exemplary system 2200 in accordance with an embodiment of the present invention. As shown in FIG. 22, multiprocessor system 2200 is a point-to-point interconnect system, and includes a first processor 2270 and a second processor 2280 coupled via a point-to-point interconnect 2250. Each of processors 2270 and 2280 may be some version of the processor 2000. In one embodiment of the invention, processors 2270 and 2280 are respectively processors 2110 and 2115, while coprocessor 2238 is coprocessor 2145. In another embodiment, processors 2270 and 2280 are respectively processor 2110 coprocessor 2145.

Processors 2270 and 2280 are shown including integrated memory controller (IMC) units 2272 and 2282, respectively. Processor 2270 also includes as part of its bus controller units point-to-point (P-P) interfaces 2276 and 2278; similarly, second processor 2280 includes P-P interfaces 2286 and 2288. Processors 2270, 2280 may exchange information via a point-to-point (P-P) interface 2250 using P-P interface circuits 2278, 2288. As shown in FIG. 22, IMCs 2272 and 2282 couple the processors to respective memories, namely a memory 2232 and a memory 2234, which may be portions of main memory locally attached to the respective processors.

Processors 2270, 2280 may each exchange information with a chipset 2290 via individual P-P interfaces 2252, 2254 using point to point interface circuits 2276, 2294, 2286, 2298. Chipset 2290 may optionally exchange information with the coprocessor 2238 via a high-performance interface 2239. In one embodiment, the coprocessor 2238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2290 may be coupled to a first bus 2216 via an interface 2296. In one embodiment, first bus 2216 may be a Peripheral Component Interconnect (PCI) bus, or a bus such as a PCI Express bus or another third generation I/O interconnect bus, although the scope of the present invention is not so limited.

As shown in FIG. 22, various I/O devices 2214 may be coupled to first bus 2216, along with a bus bridge 2218 which couples first bus 2216 to a second bus 2220. In one embodiment, one or more additional processor(s) 2215, such as coprocessors, high-throughput MIC processors, GPGPU's, accelerators (such as, e.g., graphics accelerators or digital signal processing (DSP) units), field programmable gate arrays, or any other processor, are coupled to first bus 2216. In one embodiment, second bus 2220 may be a low pin count (LPC) bus. Various devices may be coupled to a second bus 2220 including, for example, a keyboard and/or mouse 2222, communication devices 2227 and a storage unit 2228 such as a disk drive or other mass storage device which may include instructions/code and data 2230, in one embodiment. Further, an audio I/O 2224 may be coupled to the second bus 2220. Note that other architectures are possible. For example, instead of the point-to-point architecture of FIG. 22, a system may implement a multi-drop bus or other such architecture.

Figure 23:
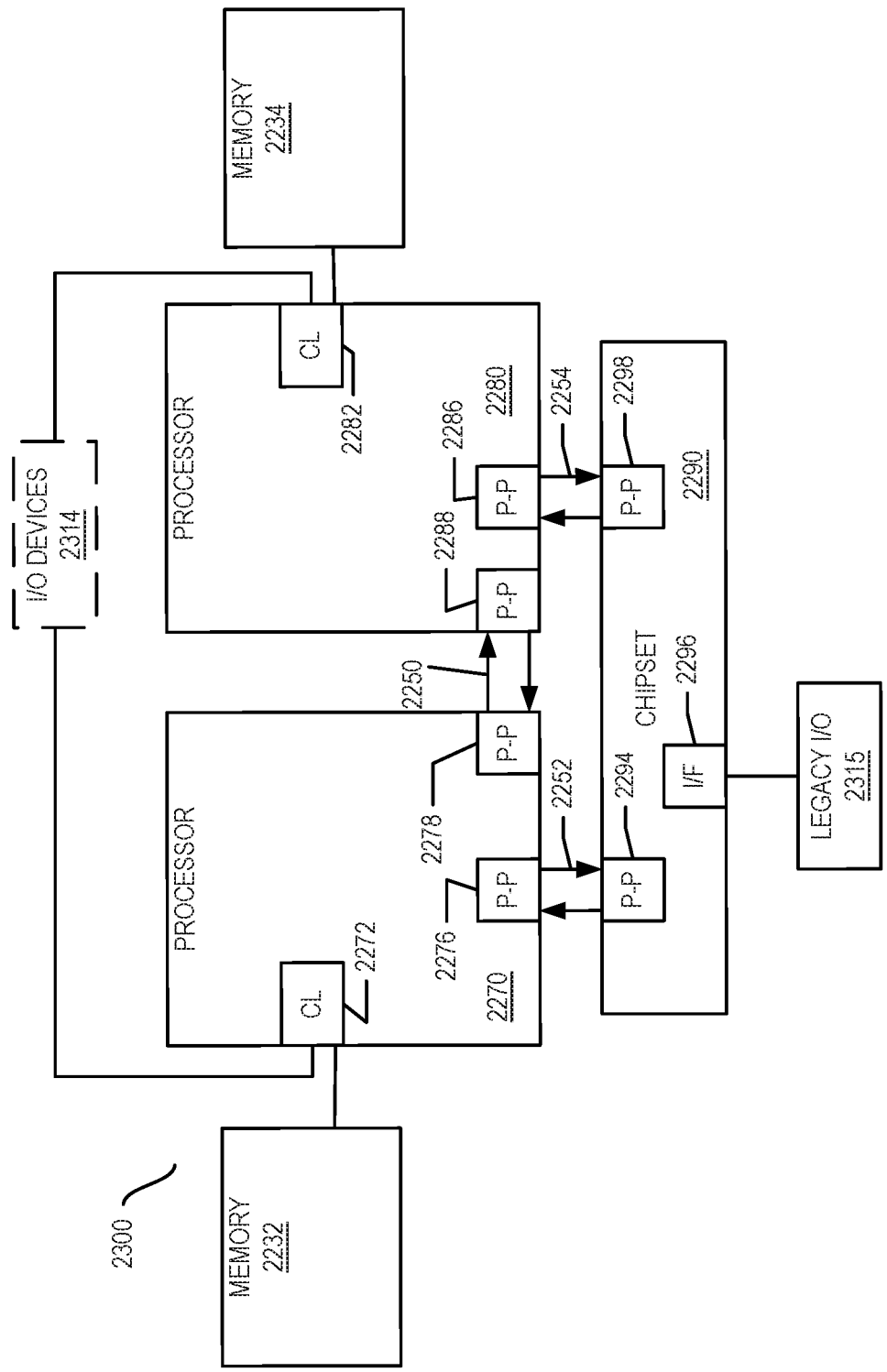
FIG. 23 is a block diagram of a third system in accordance with an embodiment of the invention.

Referring now to FIG. 23, shown is a block diagram of a second more specific exemplary system 2300 in accordance with an embodiment of the present invention. Like elements in FIGS. 22 and 23 bear like reference numerals, and certain aspects of FIG. 22 have been omitted from FIG. 23 in order to avoid obscuring other aspects of FIG. 23.

FIG. 23 illustrates that the processors 2270, 2280 may include integrated memory and I/O control logic ("CL") 2272 and 2282, respectively. Thus, the CL 2272, 2282 include integrated memory controller units and include I/O control logic. FIG. 23 illustrates that not only are the memories 2232, 2234 coupled to the CL 2272, 2282, but also that I/O devices 2314 are also coupled to the control logic 2272, 2282. Legacy I/O devices 2315 are coupled to the chipset 2290.

Figure 24:
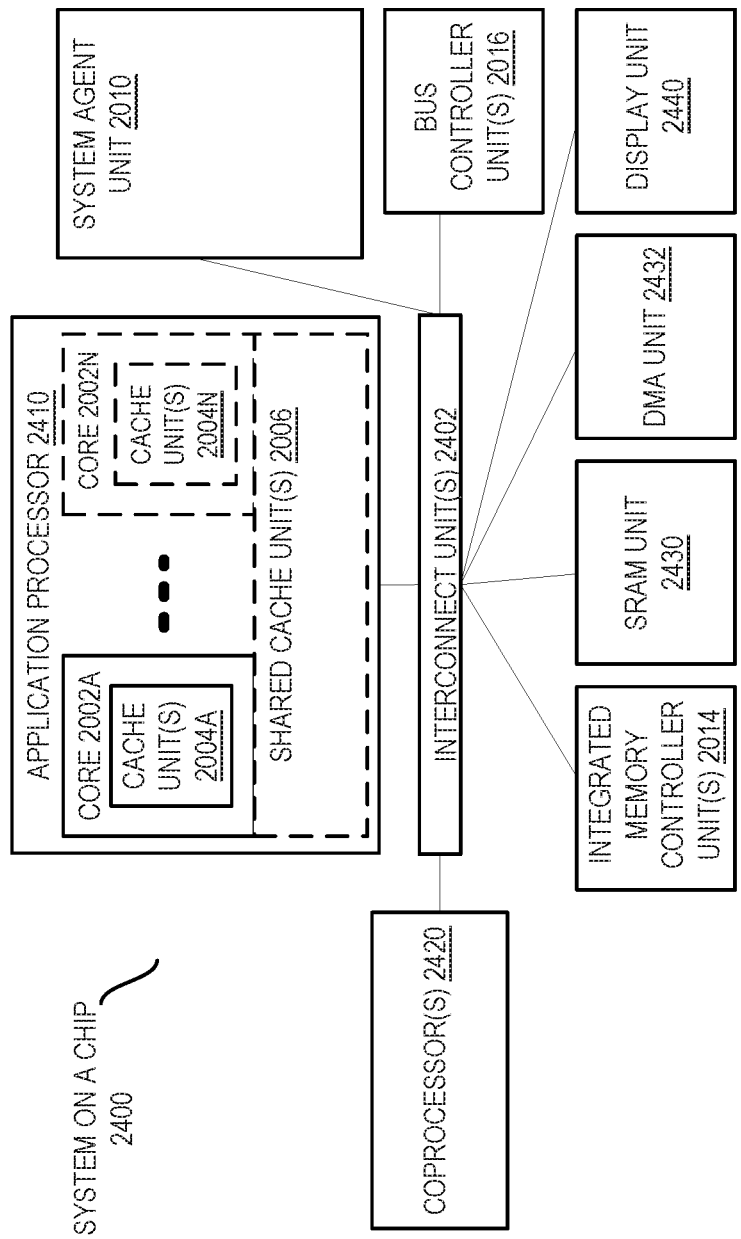
FIG. 24 is a block diagram of a SoC in accordance with an embodiment of the invention.

Referring now to FIG. 24, shown is a block diagram of a SoC 2400 in accordance with an embodiment of the present invention. Similar elements in FIG. 20 bear like reference numerals. Also, dashed lined boxes are optional features on more advanced SoCs. In FIG. 24, an interconnect unit(s) 2402 is coupled to: an application processor 2410 which includes a set of one or more cores 202A-N and shared cache unit(s) 2006; a system agent unit 2010; a bus controller unit(s) 2016; an integrated memory controller unit(s) 2014; a set or one or more coprocessors 2420 which may include integrated graphics logic, an image processor, an audio processor, and a video processor; an static random access memory (SRAM) unit 2430; a direct memory access (DMA) unit 2432; and a display unit 2440 for coupling to one or more external displays. In one embodiment, the coprocessor(s) 2420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2230 illustrated in FIG. 22, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 25 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 25 shows a program in a high level language 2502 may be compiled using an x86 compiler 2504 to generate x86 binary code 2506 that may be natively executed by a processor with at least one x86 instruction set core 2516. The processor with at least one x86 instruction set core 2516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2504 represents a compiler that is operable to generate x86 binary code 2506 (e.g., object code) that can, with or without additional linkage processing, be executed on the processor with at least one x86 instruction set core 2516. Similarly, FIG. 25 shows the program in the high level language 2502 may be compiled using an alternative instruction set compiler 2508 to generate alternative instruction set binary code 2510 that may be natively executed by a processor without at least one x86 instruction set core 2514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2512 is used to convert the x86 binary code 2506 into code that may be natively executed by the processor without an x86 instruction set core 2514. This converted code is not likely to be the same as the alternative instruction set binary code 2510 because an instruction converter capable of this is difficult to make; however, the converted code will accomplish the general operation and be made up of instructions from the alternative instruction set. Thus, the instruction converter 2512 represents software, firmware, hardware, or a combination thereof that, through emulation, simulation or any other process, allows a processor or other electronic device that does not have an x86 instruction set processor or core to execute the x86 binary code 2506.

ALTERNATIVE EMBODIMENTS

While embodiments have been described which have the function of these embodiments as being performed from within the storage system (e.g., trusted API, lockable storage, downloading and managing of premium content, activation of value-added storage service, etc.), alternative embodiments of the invention may have these functions being performed in a different part of the device. For example and in one embodiment, one or more of these described functions could be performed in different hardware (chipset, a secure core of the device, secure processor, a coupled device (USB stick, etc.), etc., and/or some other hardware block) and/or in software. Also, while the flow diagrams in the Figures show a particular order of operations performed by certain embodiments of the invention, it should be understood that such order is exemplary (e.g., alternative embodiments may perform the operations in a different order, combine certain operations, overlap certain operations, etc.).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below.

What is claimed is:

1. A method to protect data stored in a storage system of a device from malware alternation, comprising:
   initiating a boot sequence of the device, the data stored in a plurality of sectors in the storage system;
   during the boot sequence, selectively locking different ones of the plurality of sectors, wherein the selectively locking of the different ones of the plurality of sectors is an incremental locking of the different ones of the plurality of sectors during different periods of the boot up sequence; and
   completing the boot sequence such that the plurality of sectors locked.

2. The method of claim 1, wherein the locking of the different ones of the plurality sectors comprises:
   preventing a process from writing other data to the different ones of the plurality of sectors.

3. The method of claim 1, wherein the data includes a master boot record of the device.

4. The method of claim 1, wherein the data includes parts of an operating system of the device that are not to be altered after the completing the boot sequence.

* * * * *